(12) United States Patent
Tsuda et al.

(10) Patent No.: US 12,070,689 B2
(45) Date of Patent: Aug. 27, 2024

(54) NON-TRANSITORY COMPUTER READABLE MEDIUM INCLUDING OBJECT LINKING PROGRAM AND OBJECT LINKING SYSTEM

(71) Applicant: SQUARE ENIX CO., LTD., Tokyo (JP)

(72) Inventors: Makoto Tsuda, Tokyo (JP); Keita Shibata, Tokyo (JP); Manami Fushiki, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 235 days.

(21) Appl. No.: 17/584,715

(22) Filed: Jan. 26, 2022

(65) Prior Publication Data
US 2022/0233959 A1    Jul. 28, 2022

(30) Foreign Application Priority Data

Jan. 27, 2021  (JP) ................. 2021-011472
Dec. 8, 2021   (JP) ................. 2021-199676

(51) Int. Cl.
*A63F 13/56* (2014.01)
*G06T 19/00* (2011.01)

(52) U.S. Cl.
CPC .......... *A63F 13/56* (2014.09); *G06T 19/006* (2013.01)

(58) Field of Classification Search
CPC .......... A63F 13/25; A63F 13/40; A63F 13/42; A63F 13/50; A63F 13/52; A63F 13/55; A63F 13/56; A63F 13/57; A63F 13/58; G06T 19/006
See application file for complete search history.

(56) References Cited

U.S. PATENT DOCUMENTS

| | | | |
|---|---|---|---|
| 2003/0144047 A1* | 7/2003 | Sprogis ................. | G01S 5/0072 463/9 |
| 2016/0267718 A1* | 9/2016 | Fukuchi .................. | G06F 18/24 |
| 2020/0184653 A1* | 6/2020 | Faulkner ................... | G06T 7/40 |
| 2021/0125398 A1* | 4/2021 | Bradley .................... | G06T 7/70 |
| 2021/0142508 A1* | 5/2021 | Azimi ................... | G02B 27/017 |
| 2021/0201581 A1* | 7/2021 | Xie ........................ | G06T 19/20 |

FOREIGN PATENT DOCUMENTS

JP            2020204989 A      12/2020

* cited by examiner

*Primary Examiner* — Omkar A Deodhar
(74) *Attorney, Agent, or Firm* — Dorsey & Whitney LLP

(57) ABSTRACT

Provided is a non-transitory computer readable medium including an object linking program causing a server to implement, in a case where one of a real space and a virtual space augmented from the real space is a first space, and the other is a second space, a change information obtaining function of obtaining change information indicating a change in parameter or form of a first object in the first space, and a change linking processing function of performing a process causing a parameter or a form of one or more second objects in the second space to correspond to the first object after change based on the change information.

9 Claims, 16 Drawing Sheets

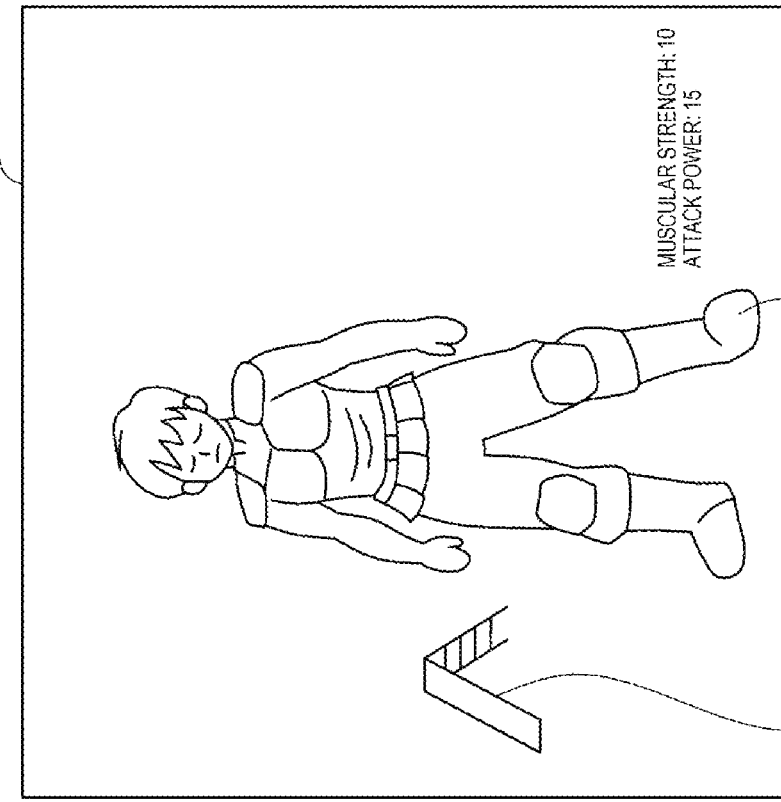

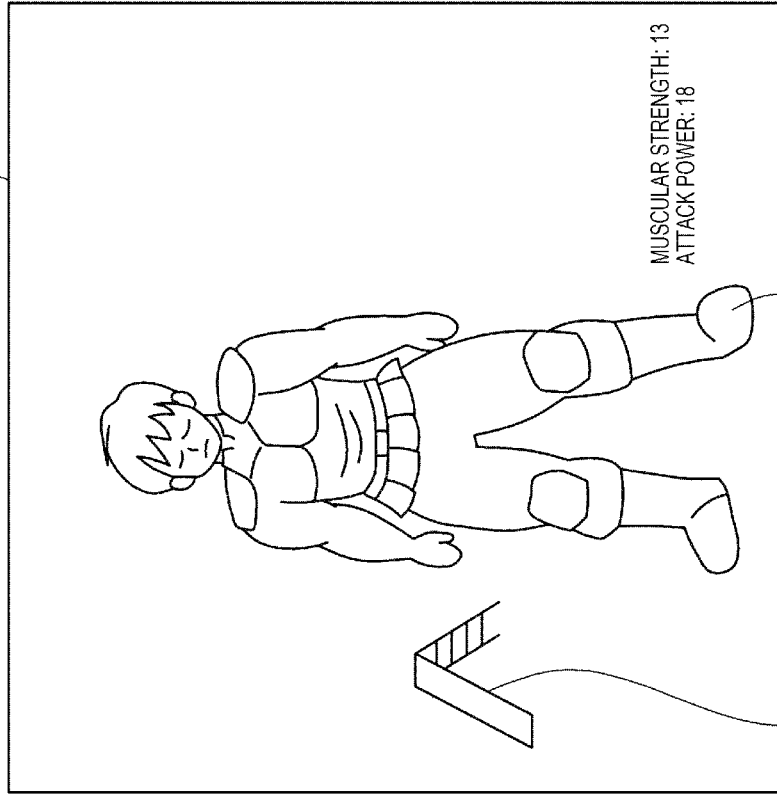

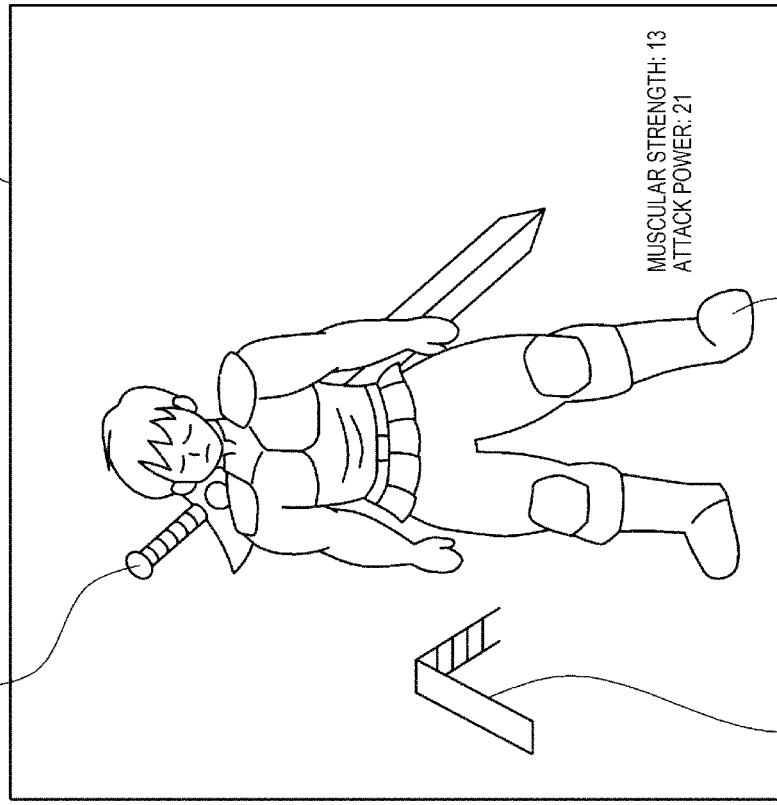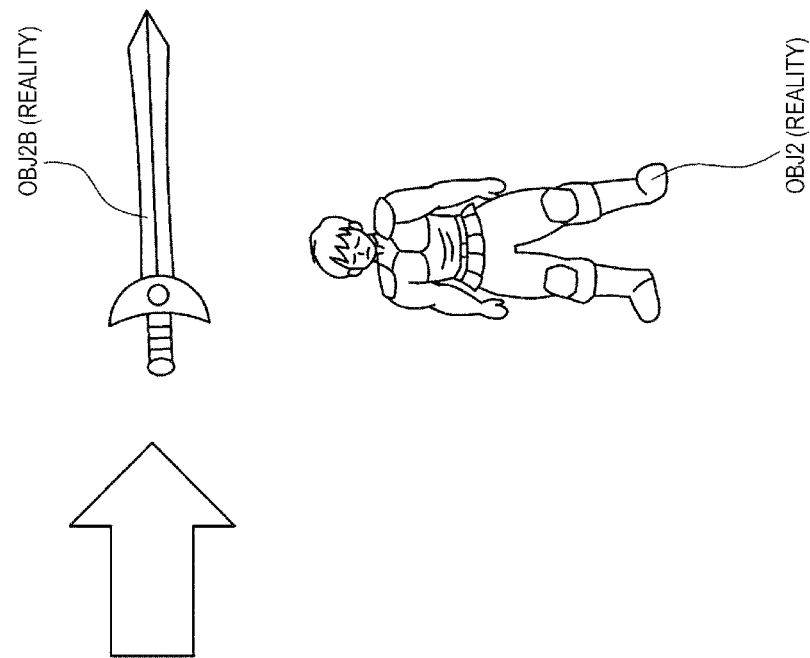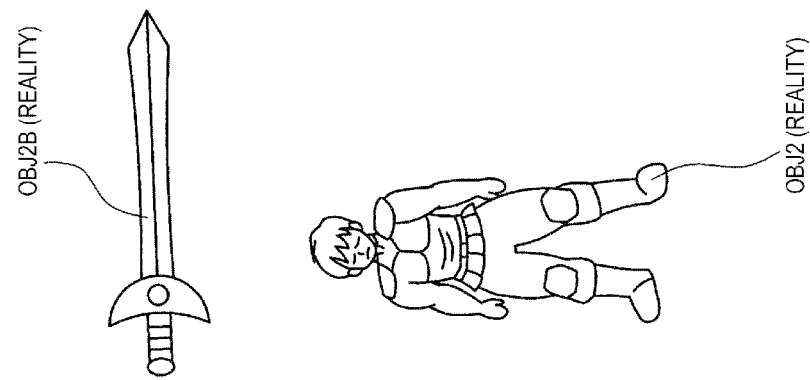

FIG. 21
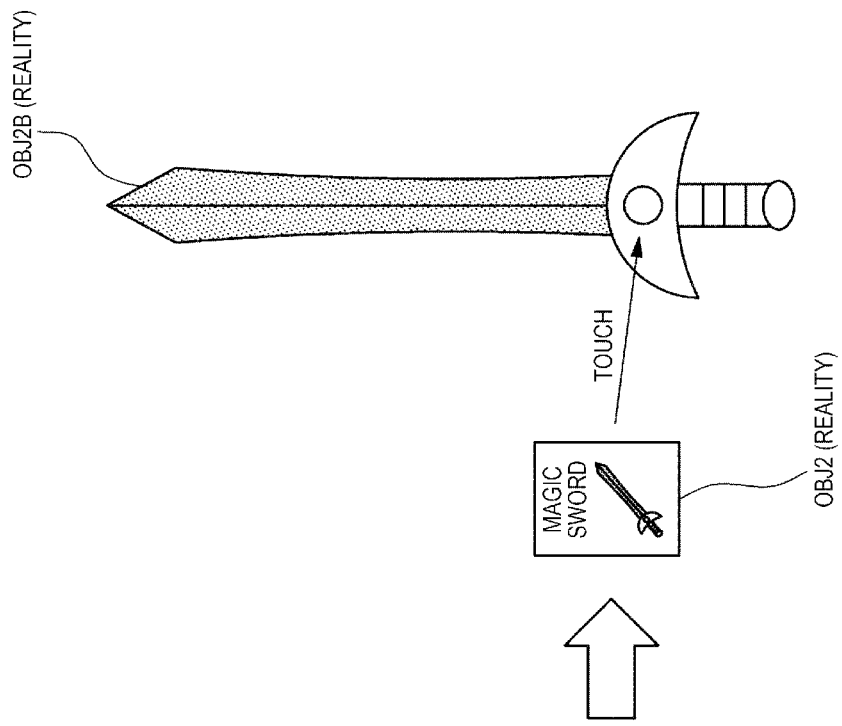
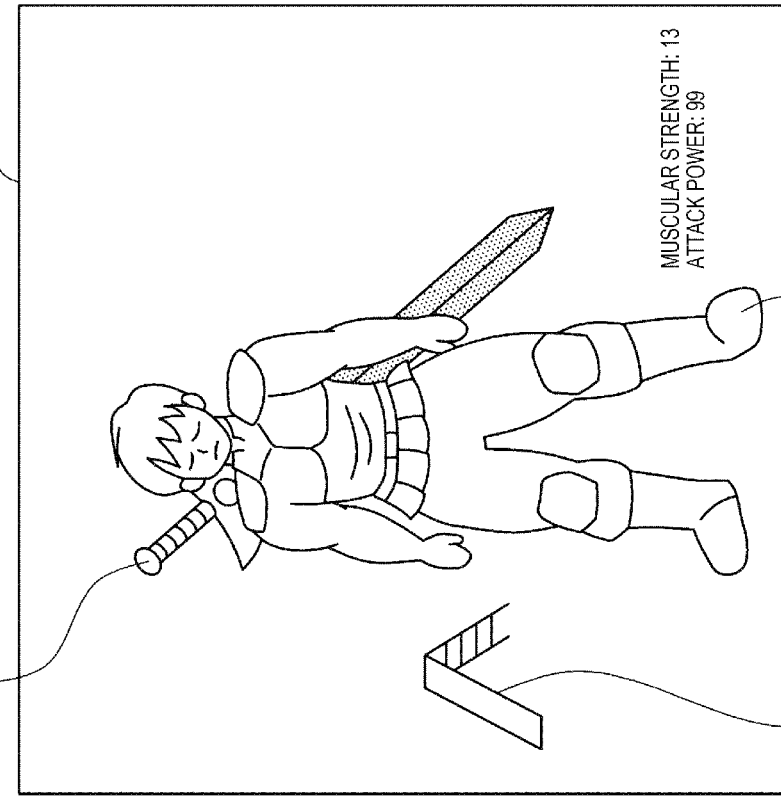

OBJECT                NFT CORRESPONDING TO OBJECT

NON-TRANSITORY COMPUTER READABLE MEDIUM INCLUDING OBJECT LINKING PROGRAM AND OBJECT LINKING SYSTEM

CROSS-REFERENCE TO RELATED APPLICATION(S)

This application claims priority to and the benefit of Japanese Patent Application No. 2021-011472, filed on Jan. 27, 2021, and Japanese Patent Application No. 2021-199676, filed on Dec. 8, 2021, the disclosure of which are expressly incorporated herein by reference in its entirety for any purpose.

BACKGROUND

At least one embodiment of the present disclosure relates to a non-transitory computer readable medium including an object linking program and an object linking system.

An apparatus that outputs an augmented reality (AR) object to a user using AR technology is known.

JP-A-2020-204989 discloses an information processing apparatus including a positional information acquisition unit that acquires positional information indicating a position of an AR apparatus which outputs an AR object seen as if being present in a real space using AR technology, a weight calculation unit that calculates a weight of a shift which is an evaluation value indicating how likely is occurrence of a shift in arrangement position of the AR object to be recognized by a plurality of users, based on the positional information of a plurality of the AR apparatuses and the arrangement position of the AR object, and an adjustment unit that adjusts a method of outputting the AR object in accordance with the weight of the shift such that the occurrence of the shift is unlikely to be recognized.

SUMMARY

The AR technology can also be applied to a game. In playing a game using the object (AR object) superimposed on the real space, in a case where a change in parameter or form is linked between an actual object such as a figure present in a real world and the AR object, the user can enjoy the game by changing the parameter or the form of the object in both of the real space and an AR space, and interest of the user is improved.

An object of at least one embodiment of the present disclosure is to solve the above problem and improve interest of a user.

From a non-limiting viewpoint, a non-transitory computer readable medium including an object linking program according to one embodiment of the present disclosure causes a server to implement, in a case where one of a real space and a virtual space augmented from the real space is a first space, and the other is a second space, a change information obtaining function of obtaining change information indicating a change in parameter or form of a first object in the first space, and a change linking processing function of performing a process causing a parameter or a form of one or more second objects in the second space to correspond to the first object after change based on the change information.

From a non-limiting viewpoint, an object linking system according to one embodiment of the present disclosure is an object linking system including a communication network, a server, and a user terminal, the object linking system including, in a case where one of a real space and a virtual space augmented from the real space is a first space, and the other is a second space, change information obtaining means for obtaining change information indicating a change in parameter or form of a first object in the first space, and change linking processing means for performing a process causing a parameter or a form of one or more second objects in the second space to correspond to the first object after change based on the change information.

From a non-limiting viewpoint, a non-transitory computer readable medium including an object linking program according to one embodiment of the present disclosure causes a user terminal to implement, in a case where one of a real space and a virtual space augmented from the real space is a first space, and the other is a second space, a change information obtaining function of obtaining change information indicating a change in parameter or form of a first object in the first space, and a change linking processing function of performing a process causing a parameter or a form of one or more second objects in the second space to correspond to the first object after change based on the change information.

Each embodiment of the present application solves one or two or more deficiencies.

BRIEF DESCRIPTION OF THE DRAWINGS

FIG. 18 is a conceptual diagram illustrating linking between the first object and the second object according to at least one embodiment of the present disclosure.

FIG. 19 is a conceptual diagram illustrating linking between the first object and the second object according to at least one embodiment of the present disclosure.

FIG. 20 is a conceptual diagram illustrating linking between the first object and the second object according to at least one embodiment of the present disclosure.

FIG. 21 is a conceptual diagram illustrating linking between the first object and the second object according to at least one embodiment of the present disclosure.

DETAILED DESCRIPTION

Hereinafter, an example of embodiments of the present disclosure will be described with reference to the drawings. Various constituents in the example of each embodiment described below can be appropriately combined without contradiction or the like. In addition, contents described as an example of a certain embodiment may not be described in other embodiments. In addition, contents of operations or processes not related to a characteristic part of each embodiment may be omitted. Furthermore, an order of various processes constituting various flows or sequences described below may be changed without contradiction or the like in process contents.

First Embodiment

A summary of a first embodiment of the present disclosure will be described. Hereinafter, an object linking program executed in a server will be illustratively described as the first embodiment.

Figure 1:
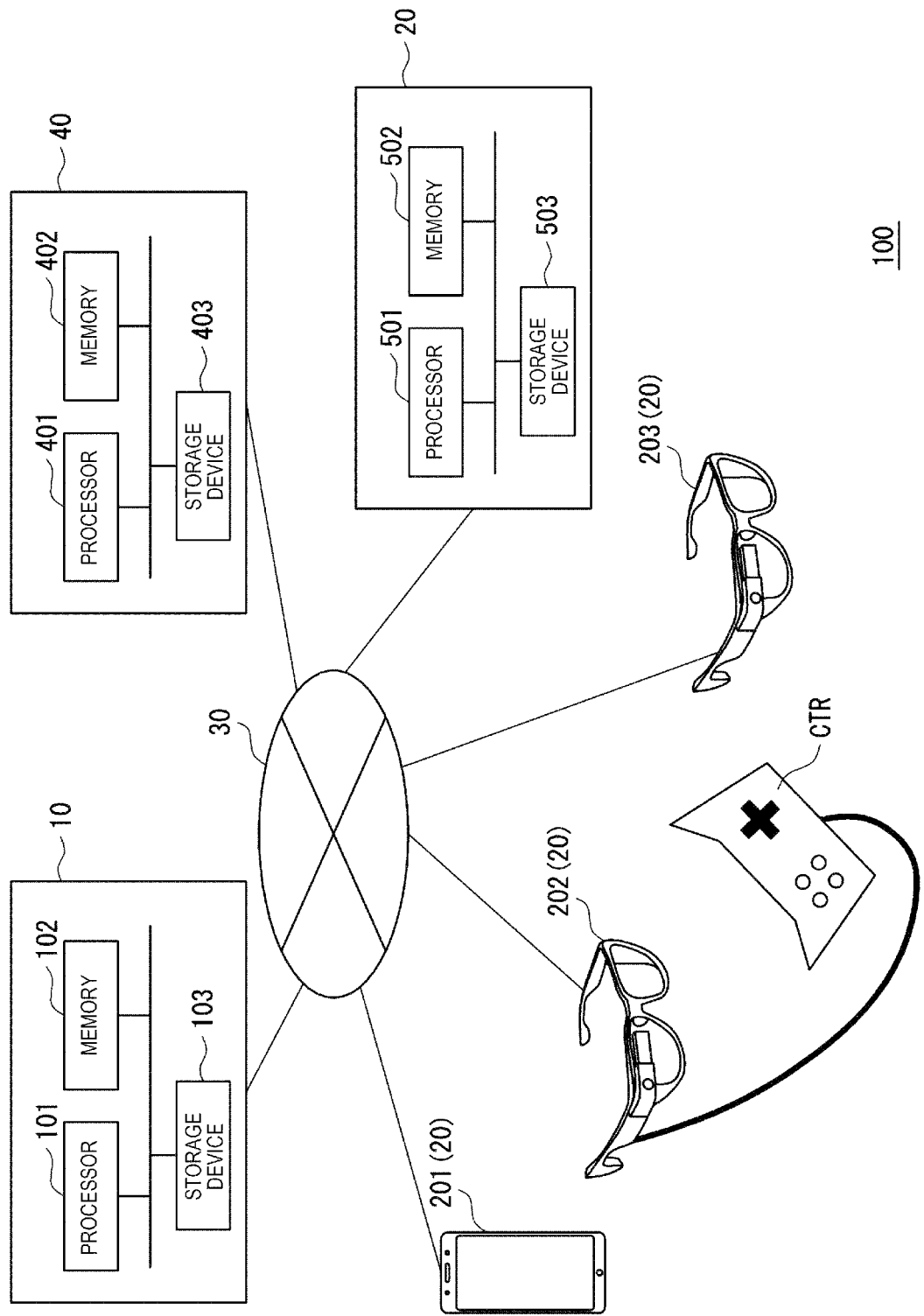
FIG. 1 is a diagram illustrating an example of a configuration of an object linking system according to at least one embodiment of the present disclosure.

FIG. 1 is a diagram illustrating an example of a configuration of an object linking system according to at least one embodiment of the present disclosure. An object linking system 100 includes an object linking processing server 10 (server 10) and a user terminal 20 used by a user of the object linking system 100. Each of user terminals 201, 202, and 203 is an example of the user terminal 20. The configuration of the object linking system 100 is not limited thereto. For example, the object linking system 100 may have a configuration in which a plurality of users use a single user terminal. The object linking system 100 may include a plurality of servers. For example, the object linking system 100 may further include another server 40.

Each of the server 10 and a plurality of the user terminals 20 is communicably connected to a communication network 30 such as the Internet. Connection between the communication network 30 and the server 10 and connection between the communication network 30 and the plurality of user terminals 20 may be wired connection or wireless connection. For example, the plurality of user terminals 20 may be connected to the communication network 30 by performing data communication with a base station managed by a communication service provider using a wireless communication line. The other server 40 is also communicably connected to the communication network 30. Connection between the communication network 30 and the other server 40 may be wired connection or wireless connection.

The object linking system 100, by including the server 10 and the user terminal 20, implements various functions for executing various processes in accordance with an operation of a user.

The server 10 includes a processor 101, a memory 102, and a storage device 103. For example, the processor 101 is a central processing device such as a central processing unit (CPU) that performs various calculations and controls. In addition, in a case where the server 10 includes a graphics processing unit (GPU), the GPU may perform a part of the various calculations and controls. The server 10 executes various information processes by the processor 101 using data read into the memory 102 and stores obtained process results in the storage device 103 as needed.

The storage device 103 has a function as a storage medium storing various information. A configuration of the storage device 103 is not particularly limited but is preferably a configuration capable of storing all of various information necessary for controls performed in the object linking system 100 from a viewpoint of reducing a process load exerted on the user terminal 20. Such examples include an HDD and an SSD. However, the storage device storing various information may have a storage region in an accessible state from the server 10 and, for example, may be configured to have a dedicated storage region outside the server 10. The server 10 is managed by a manager or the like of the object linking system 100 and has various functions for providing information related to various processes to the plurality of user terminals 20. The server 10 is configured with an information processing apparatus such as a game server that can render AR display data.

The user terminal 20 is configured with a communication terminal that can provide an information service accompanying display in AR to the user. Examples of the communication terminal include, for example, the mobile phone terminal 201 such as a smartphone and the AR glasses 202 and 203. The communication terminal may be a stationary game apparatus, a portable game apparatus, a personal computer, a gaming PC, or a so-called wearable device, or a combination of a plurality of the communication terminals. The configuration of the user terminal that may be included in the object linking system 100 is not limited thereto and may be a configuration in which the user may visually recognize the display in AR.

The user terminal 20 includes a processor 501, a memory 502, and a storage device 503. For example, the processor 501 is a central processing device such as a central processing unit (CPU) that performs various calculations and controls. In addition, in a case where the user terminal 20 includes a graphics processing unit (GPU), the GPU may perform a part of the various calculations and controls. The user terminal 20 executes various information processes by the processor 501 using data read into the memory 502 and stores obtained process results in the storage device 503 as needed. The storage device 503 has a function as a storage medium storing various information.

The user terminal 20 is connected to the communication network 30 and includes hardware and software for executing various processes by communicating with the server 10 or the other server 40. Each of the plurality of user terminals 20 may be configured to be capable of directly communicating with each other without the server 10 or the other server 40.

The user terminal 20 may incorporate a display device. The display device may be connected to the user terminal 20 in a wireless or wired manner. The display device displays images such as a still picture and a motion picture. The display device may display a game screen. In addition, the display device can perform display in augmented reality (AR) superimposed on a real space. Examples of the display device include a hologram display device that can perform hologram display, and a projection device that projects images (including the game screen) to a screen or the like. In the example in FIG. 1, a touch panel screen included in the mobile phone terminal 201, AR displays included in the AR glasses 202 and 203, and the like correspond to the display device.

The user terminal 20 may incorporate an input device. In addition, the input device may be connected to the user terminal 20 in a wireless or wired manner. The input device receives an operation input provided by the user. The processor included in the server 10 or the processor included in the user terminal 20 executes various control processes in accordance with the operation input provided by the user. Examples of the input device include the touch panel screen included in the mobile phone terminal 201, a controller CTR that is connected to the AR glasses 202 in a wireless or wired manner, and the like. In addition, a camera included in the user terminal 20 may correspond to the input device. The user provides the operation input (gesture input) by a gesture such as moving a hand in front of the camera. The user terminal is not limited thereto.

The other server 40 includes a processor 401, a memory 402, and a storage device 403. For example, the processor 401 is a central processing device such as a central processing unit (CPU) that performs various calculations and controls. In addition, in a case where the other server 40 includes a graphics processing unit (GPU), the GPU may perform a part of the various calculations and controls. The other server 40 executes various information processes by the processor 401 using data read into the memory 402 and stores obtained process results in the storage device 403 as needed.

The storage device 403 has a function as a storage medium storing various information. The configuration of the storage device 403 is not limited thereto. The storage device storing various information may have a storage region in an accessible state from the other server 40 and, for example, may be configured to have a dedicated storage region outside the other server 40. The other server 40 may be managed by the manager or the like of the object linking system 100 or may be managed by other persons. The other server 40 has various functions for providing information related to various processes to the plurality of user terminals 20. For example, the other server 40 may be a server that manages manufacturing and delivery of an actual article.

Figure 2:
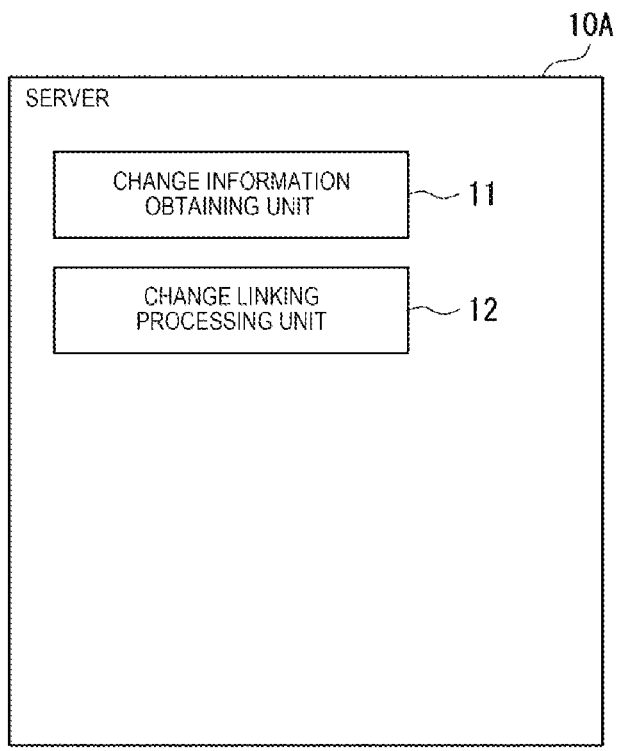
FIG. 2 is a block diagram illustrating a configuration of a server according to at least one embodiment of the present disclosure.

FIG. 2 is a block diagram illustrating a configuration of the server according to at least one embodiment of the present disclosure. A server 10A that is an example of the configuration of the server 10 includes at least a change information obtaining unit 11 and a change linking processing unit 12. The processor included in the server 10A functionally implements the change information obtaining unit 11 and the change linking processing unit 12 by referring to the object linking program held (installed) in the storage device and executing the program.

The change information obtaining unit 11 has a function of obtaining change information indicating a change in parameter or form of a first object in a first space in a case where one of the real space and a virtual space augmented from the real space is the first space, and the other is a second space. The change linking processing unit 12 has a function of performing a process causing a parameter or a form of one or more second objects in the second space to correspond to the first object after change based on the change information.

Figure 3:
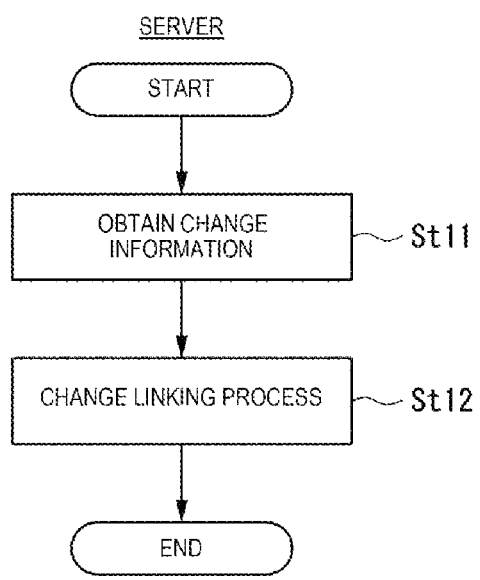
FIG. 3 is a flowchart illustrating an example of an object linking process according to at least one embodiment of the present disclosure.

Next, a program execution process in the first embodiment of the present disclosure will be described. FIG. 3 is a flowchart illustrating an example of an object linking process according to at least one embodiment of the present disclosure.

The change information obtaining unit 11 obtains the change information indicating a change in parameter or form of the first object in the first space (St11). The change linking processing unit 12 performs the process (change linking process) causing the parameter or the form of one or more second objects in the second space to correspond to the first object after change based on the change information (St12).

The real space means a space in a real world. The virtual space augmented from the real space means a virtual space (AR space) corresponding to an AR object displayed (displayed in AR) in a superimposed manner on the real space.

The first object and the second object will be described. The first object and the second object have opposite meanings depending on whether the first space is the real space or the virtual space augmented from the real space. Thus, here, a case where the virtual space augmented from the real space (hereinafter, may be simply referred to as the virtual space) is the first space will be illustratively described.

In a case where the virtual space augmented from the real space is the first space, the first object means a virtual object that can be output (displayed) in the virtual space. Examples of the first object include an item that can be output (for example, displayed) in the virtual space. For example, the item may be a sword, a shield, a helmet, an armor, a wand, clothes, an orb, a gun, or a musical instrument. The first object in the above case may be a vehicle. For example, the vehicle may be an automobile, an electric train, a motorcycle, a mine car, a ship, an airplane, or a robot. The first object in the above case may be an animate object such as a bird, a cat, a dog, a dinosaur, grass, or a tree. A fictional animate object such as a dragon may also be the first object in the above case. Furniture such as a chair or a desk, a built object such as a house or a building, a street, a continent, a planet, a star, or the like that can be output in the virtual space as a virtual object may also correspond to the first object. Besides, for example, a character (includes both of a non-player character and a player character) appearing in a video game or an avatar of the user may also correspond to the first object. An augmented reality diorama described later may also correspond to the first object. These first objects may be held in a storage device included in the object linking system 100 or a storage device connectable to the object linking system 100 in a format of 3D model data that can be displayed in AR.

The augmented reality diorama means a virtual diorama displayed in a superimposed manner on the real space. Examples of the augmented reality diorama include a street, a road, a railway, a built object, a group of built objects, a stadium of baseball, soccer, or the like, a shrine or a temple, a castle, a mountain, the sea, a river, a swamp, a grove, a forest, a field, a paddy field, an airport, an underground passage, a cave, and the like represented as 3D model data to be displayed in augmented reality (AR). The augmented reality diorama may not necessarily be based on a modern landscape that exists in the reality. Examples of the augmented reality diorama also include a medieval European streetscape or construction and a fictional streetscape or construction appearing in an animation, a comic book, or the like.

In a case where the virtual space augmented from the real space is the first space, the second object means an actual object present in the real space. The second object may be an object for playing (play object). Examples of the second object include a miniature car, a doll, a transformation belt, a sword, a shield, a gun, a magic wand, and other toys present in the real space. Besides, a diorama (for example, an N-scale diorama) present in the real space is also an actual object present in the real space and thus, corresponds to the second object.

The second object may be a miniature toy (for example, a miniature car that is a miniature toy of an automobile, or a figure corresponding to a character or an avatar in the virtual space) of each object illustrated above as the first object. In addition, the second object may be a card (for example, a card for a card game) or the like having information related to each object illustrated above as the first object. For example, a card of which a drawing of each object illustrated above as the first object is drawn on an outer surface or an inner surface, or a card in which information indicating each object illustrated above as the first object is written as data may correspond to the second object.

The first object and the second object may correspond to each other. For example, in a case where the first object is an automobile in the virtual space, the second object may be a miniature toy of an automobile in the real space, a card in which information about an automobile is written, or the like. In a case where the first object is an augmented reality diorama, the second object may be a diorama in the real world.

In a case where the real space is the first space, and the virtual space is the second space, a content of meaning of each of the first object and the second object is opposite to the above content. For example, a miniature car in the real space is the first object, and a 3D model or the like of an automobile that can be output (displayed) in the virtual space is the second object.

A parameter of an object is a value indicating an attribute of the object and is referred to as a status or status information in the field of game. In a case where the object is a character, examples of the parameter include health (HP), mana (MP), strength (STR), attack power (ATK), vitality (VIT), defense power (DEF), intelligence (INT), resistance (RES), dexterity (DEX), agility (AGI), luck (LU K), a level (LV), an experience value (EXP), a skill point (SP), and the like. In a case where the object is an inanimate object such as a wall or a weapon, examples of the parameter include hardness, rarity, and the like. In a case where the object is a vehicle, examples of the parameter include a speed, acceleration, turnability, horsepower, traction, thrust, rigidity, and the like. The above are examples of the parameter, and the object may have other types of parameters.

A form of an object means a shape, a pattern, or a color, or a combination thereof of the object in a predetermined basic pose. As an example of a change in shape, in a case where a wing is mounted on the rear of a miniature car that is an object, the shape of the miniature car changes. As an example of a change in pattern, in a case where an emblem appears on the forehead, a cheek, or the like of a character that is an object, the pattern of the character changes. As an example of a change in color, in a case where color of hair or skin of a character that is an object changes to blue, red, gold, or the like, the color of the character changes. Comparison in shape between objects may be performed in the respective basic poses (for example, a standing state) thereof. Thus, a change in form of the object here does not include a change in pose and a change in position of the object.

An object may have a correlation relationship between a change in parameter and a change in form. For example, in a case where a wing is mounted on the rear of the miniature car, not only the shape changes, but also the parameter "speed" changes. A parameter "power" may change in accordance with a change in pattern or color such that an emblem appears on the forehead of the character, or the color of hair changes.

Causing the parameter or the form of the second object to correspond to the first object after change means changing the parameter or the form of the second object in accordance with the change in parameter or form of the first object. In a case where the real space is the first space, a specific example of the above is such that in a case where the user mounts a wing on a miniature car that is the first object, a wing is also mounted on an automobile that is the second object in the virtual space under control of the server 10, and the parameter "speed" that is an attribute value of the second object is increased. In a case where the virtual space is the first space, a specific example of the above is such that in a case where a wing is mounted on an automobile that is the first object in the virtual space under control of the server 10, the server 10 outputs or transmits command information for shipping an actual article of the wing that is an additional part to the user, to a server (the server 10 or the other server 40 or the like) that manages manufacturing or shipping of the actual article. Besides, the server 10 may output or transmit command information for shipping an actual article of a miniature car on which a wing is mounted, or may transmit a command to print the actual article to a 3D printer. Command information for writing data indicating a wing or data indicating an automobile on which a wing is mounted into a card (second object) may be transmitted to a card writer directly from the server 10 or through the user terminal 20. In a case where a lock mechanism (for example, a key) that prevents a change in form is disposed in the actual article, an unlock signal for unlocking the lock may be transmitted toward the actual article from the server 10. For example, the change linking processing unit 12 controls the above information process. The above process example is merely an example. The change linking processing unit 12 may perform various processes in which the parameter or the form of the second object is linked to a change in parameter or form of the first object based on the change information obtained by the change information obtaining unit 11.

A change in parameter or form of the first object may not be the same as a change in parameter or form of the second object in a strict sense. In a case of an object in the virtual space, the object can be changed to any form. However, an object in the real space has physical restrictions. Thus, the same change may not be made between the virtual space and the real space in a strict sense. Thus, in the real space, the actual object may be colored to have a color that is similar to the color in the virtual space and can be represented in the reality. In addition, in a case where an object having the shape of the object in the virtual space falls down due to a position or the like of a center of gravity in the real space, the shape of the actual object in the real space may be appropriately changed.

Parameters or forms of a plurality of the second objects may be changed in connection with a change in parameter or form of the first object. For example, when the user attaches a wing to a miniature car, 100 automobiles to which wings are attached may be displayed in AR on the display device in the virtual space under control of the change linking processing unit 12.

As one aspect of the first embodiment, in a case of playing a game using an object (AR object) superimposed on the real space, a change in parameter or form can be linked between an actual object such as a figure present in the real world and the AR object. Thus, the user can enjoy the game by changing the parameter or the form of the object in both of the real space and the AR space, and the interest of the user can be improved.

Second Embodiment

A summary of a second embodiment of the present disclosure will be described. Hereinafter, an object linking program executed in a server will be illustratively described as the second embodiment. The server may be the server 10 included in the object linking system 100 illustrated in FIG. 1.

Figure 4:
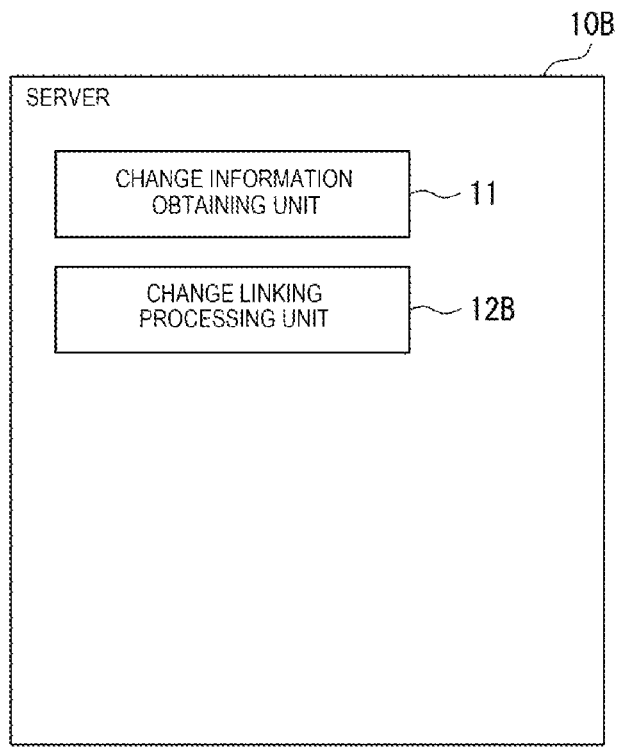
FIG. 4 is a block diagram illustrating a configuration of the server according to at least one embodiment of the present disclosure.

FIG. 4 is a block diagram illustrating a configuration of the server according to at least one embodiment of the present disclosure. A server 10B that is an example of the configuration of the server 10 includes at least the change information obtaining unit 11 and a change linking processing unit 12B. The processor included in the server 10B functionally implements the change information obtaining unit 11 and the change linking processing unit 12B by referring to the object linking program held (installed) in the storage device and executing the program.

The change information obtaining unit 11 has a function of obtaining the change information indicating a change in parameter or form of the first object in the first space in a case where one of the real space and the virtual space augmented from the real space is the first space, and the other is the second space. The change linking processing unit 12B has a function of performing the process causing the parameter or the form of one or more second objects in the second space to correspond to the first object after change based on the change information in a case where a numerical value related to the change in parameter or form of the first object is greater than a predetermined value.

Figure 5:
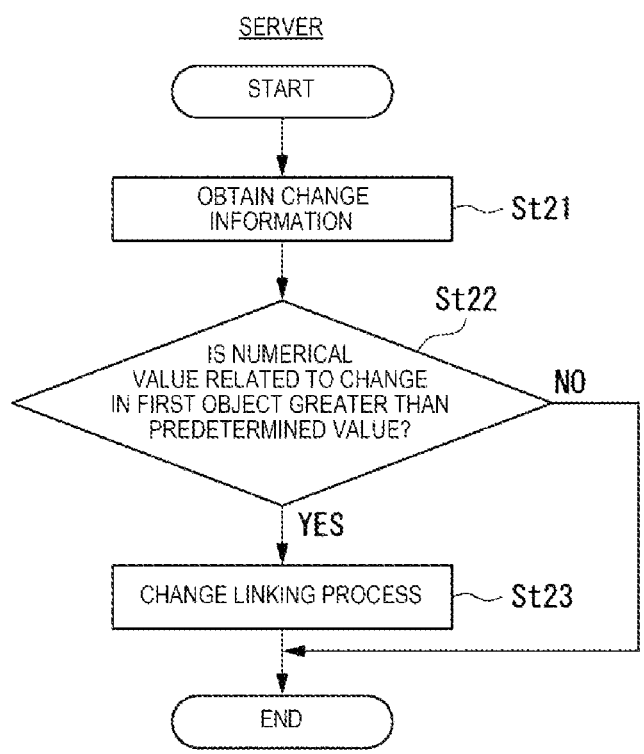
FIG. 5 is a flowchart illustrating an example of the object linking process according to at least one embodiment of the present disclosure.

Next, a program execution process in the second embodiment of the present disclosure will be described. FIG. 5 is a flowchart illustrating an example of the object linking process according to at least one embodiment of the present disclosure.

The change information obtaining unit 11 obtains the change information indicating a change in parameter or form of the first object in the first space (St21). The change linking processing unit 12B determines whether or not the numerical value related to the change in parameter or form of the first object is greater than the predetermined value (St22). In FIG. 5, the numerical value related to the change in parameter or form of the first object is simply referred to as the numerical value related to the change in first object. In a case where a determination that the numerical value related to the change in parameter or form of the first object is greater than the predetermined value is made (St22: Yes), the process transitions to step St23. In a case where a determination that the numerical value related to the change in parameter or form of the first object is not greater than the predetermined value is made (St22: No), the process illustrated in FIG. 5 is finished.

In step St23, the change linking processing unit 12B performs the process (change linking process) causing the parameter or the form of one or more second objects in the second space to correspond to the first object after change based on the change information.

The numerical value related to the change in parameter or form of the first object means a numerical value having any correlation with the change in parameter or form of the first object. For example, the numerical value related to the change in parameter or form of the first object may be a numerical value having a correlation with a demand of the user (how much the user desires the change) for the change in parameter or form of the first object.

Specific examples of the numerical value related to the change in parameter or form of the first object are as follows.

The number of times the parameter or the form of the first object changes.

A cumulative value of points or money used for changing the parameter or the form of the first object.

The number or a cumulative total number of users who change the parameter or the form of the first object.

In a case where an achievement condition for changing the parameter or the form of the first object is present, the number of times the achievement condition is satisfied.

Specific examples of the achievement condition are as follows

The number of times data indicating a predetermined application or a predetermined object is downloaded is greater than or equal to a certain value.

The number or a cumulative total number of users who download data indicating a predetermined application or a predetermined object is greater than or equal to a certain value.

The number of times a predetermined user installs a predetermined application on the user terminal or the like of the user, or the number of the predetermined applications installed is greater than or equal to a certain value.

The number of times a still picture or a motion picture for advertisement is displayed on the display device included in the user terminal or the like, or a total value of a display time period is greater than or equal to a certain value.

The number of times the user draws lots is greater than or equal to a certain value.

The number of missions completed by a predetermined user within a predetermined game is greater than or equal to a certain value.

A value of a level of a character used by a predetermined user within a predetermined game is greater than or equal to a certain value.

A predetermined user plays a predetermined game up to a predetermined checkpoint (for example, a second chapter).

For example, in a case where the numerical value related to the change in parameter or form of the first object is large, the demand of the user for changing the parameter or the form of the first object is estimated to be high. Therefore, in a case where a demand higher than or equal to a certain degree is estimated, the change linking processing unit 12B performs the change linking process. Accordingly, a change in parameter or form of the second object can be linked to a change in parameter or form of the first object in accordance with the demand of the user. Particularly, in a case where the real space is the second space, linking of the change in parameter or form takes a certain cost (for example, a manufacturing cost or a mailing cost for the actual article of the additional part). Thus, linking between the real space and the virtual space can be efficiently performed by prioritizing a change for which the demand of the user is high.

As one aspect of the second embodiment, objects for which linking between the real space and the virtual space is performed can be limited to a part of objects based on the numerical value related to the change in parameter or form of the first object.

Third Embodiment

A summary of a third embodiment of the present disclosure will be described. Hereinafter, an object linking program executed in a server will be illustratively described as the third embodiment. The server may be the server 10 included in the object linking system 100 illustrated in FIG. 1.

Figure 6:
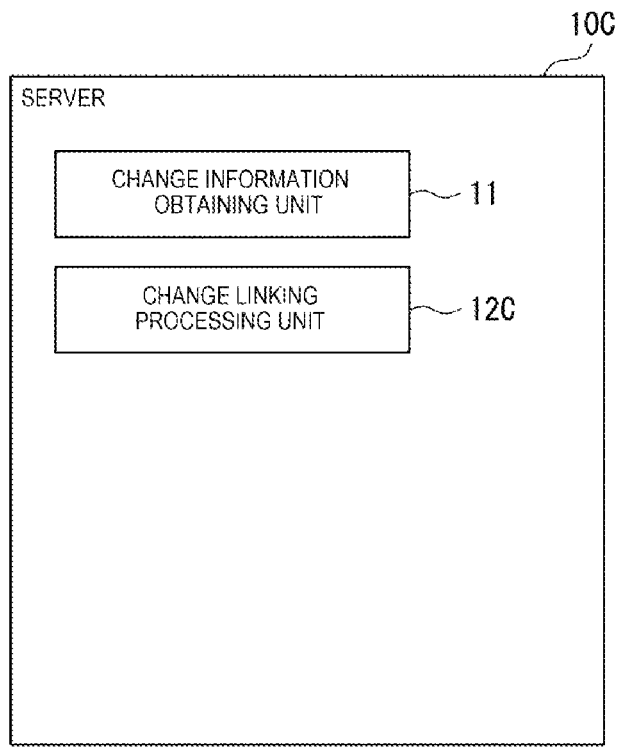
FIG. 6 is a block diagram illustrating a configuration of the server according to at least one embodiment of the present disclosure.

FIG. 6 is a block diagram illustrating a configuration of the server according to at least one embodiment of the present disclosure. A server 10C that is an example of the configuration of the server 10 includes at least the change information obtaining unit 11 and a change linking processing unit 12C. The processor included in the server 100 functionally implements the change information obtaining unit 11 and the change linking processing unit 12C by referring to the object linking program held (installed) in the storage device and executing the program.

The change information obtaining unit 11 has a function of obtaining the change information indicating a change in parameter or form of the first object in the first space in a case where one of the real space and the virtual space augmented from the real space is the first space, and the other is the second space. The change linking processing unit 12C has a function of performing the process causing the parameter or the form of one or more second objects in the second space to correspond to the first object after change in a case where using a co-used object that is used together with the first object in the first space changes the parameter or the form of the first object.

Figure 7:
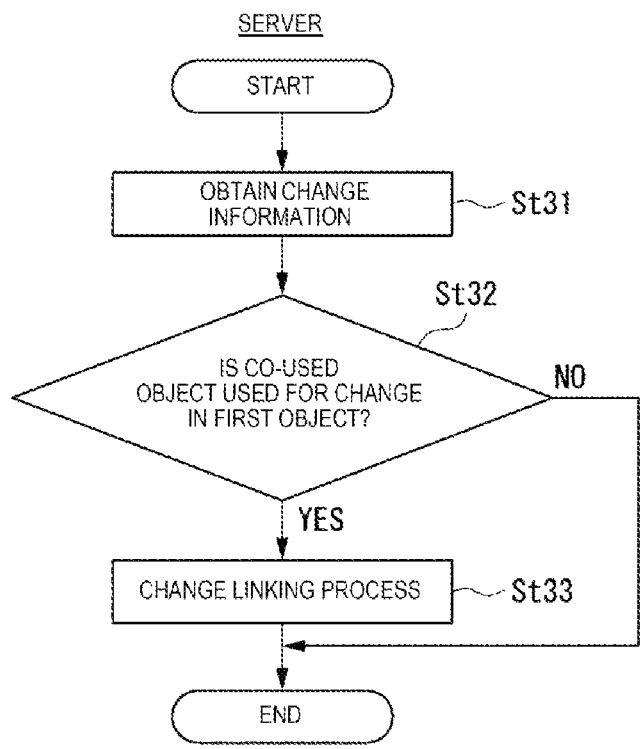
FIG. 7 is a flowchart illustrating an example of the object linking process according to at least one embodiment of the present disclosure.

Next, a program execution process in the third embodiment of the present disclosure will be described. FIG. 7 is a flowchart illustrating an example of the object linking process according to at least one embodiment of the present disclosure.

The change information obtaining unit 11 obtains the change information indicating a change in parameter or form of the first object in the first space (St31). The change linking processing unit 12C determines whether or not using the co-used object changes the parameter or the form of the first object based on the obtained change information (St32). In a case where a determination that using the co-used object changes the parameter or the form of the first object is made (St32: Yes), the process transitions to step St33. In a case where a determination that using the co-used object does not change the parameter or the form of the first object is made (St32: No), the process illustrated in FIG. 7 is finished.

In step St33, the change linking processing unit 12C performs the process (change linking process) causing the parameter or the form of one or more second objects in the second space to correspond to the first object after change based on the change information (St33).

The co-used object means an object that is used together with the first object in the first space. In a case where the first object is a miniature car or a figure present in the real space, examples of the co-used object include an additional part such as a wing attached to the rear of the miniature car or a sword, a wand, a jewel, or the like possessed by the figure. In addition, in a case where the first object is a doll present in the real space, a costume or clothes worn on the doll, a key inserted into a keyhole disposed in the doll in order to undress the doll, or the like corresponds to the co-used object. In the former case, a state where a character obtains a power-up when the character increases in size is assumed. In the latter case, a state where a character conversely obtains a power-up when the character decreases in size is assumed. A card that is inserted into a card slot disposed in the first object and in which information indicating an additional part or information indicating a change in status of the first object is written is also an example of the co-used object. The co-used object may be an object that is used together with the first object in other aspects. In a case where the virtual space is the first space, a virtual object corresponding to the co-used object present in the real space may be a co-used object in the virtual space.

As one aspect of the third embodiment, a change in parameter or form of the first object in a case of using the co-used object can be linked to a change in parameter or form of the second object. Thus, for example, since assembly of parts or replacement of parts is linked between the real space and the virtual space, the interest of the user can be further improved.

Fourth Embodiment

A summary of a fourth embodiment of the present disclosure will be described. Hereinafter, an object linking system will be illustratively described as the fourth embodiment.

Figure 8:
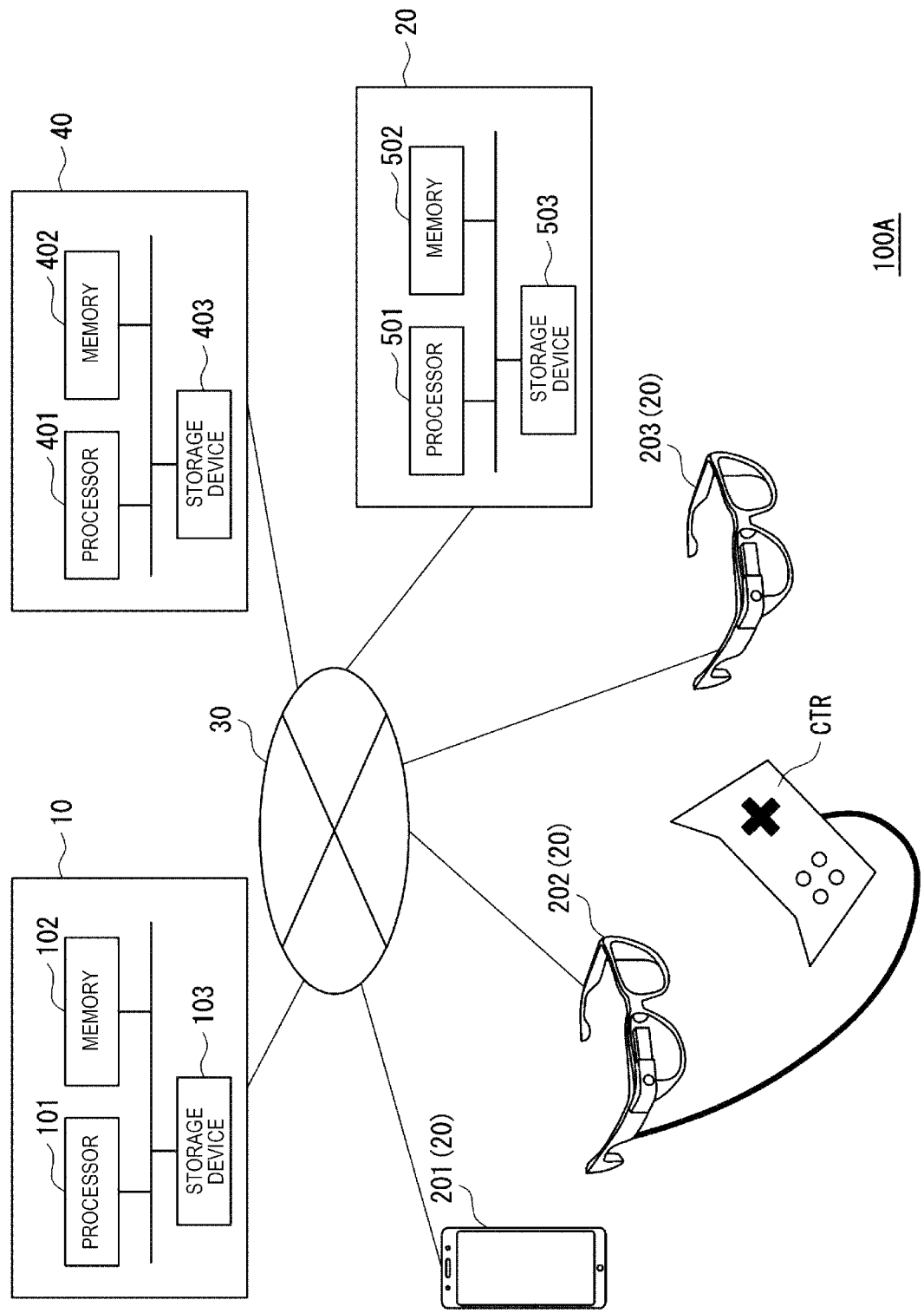
FIG. 8 is a diagram illustrating an example of the configuration of the object linking system according to at least one embodiment of the present disclosure.

FIG. 8 is a diagram illustrating an example of the configuration of the object linking system according to at least one embodiment of the present disclosure. An object linking system 100A includes the object linking processing server 10 (server 10) and the user terminal 20 used by a user of the object linking system 100A. Each of the user terminals 201, 202, and 203 is an example of the user terminal 20. The configuration of the object linking system 100A is not limited thereto. For example, the object linking system 100A may have a configuration in which a plurality of users use a single user terminal. The object linking system 100A may include a plurality of servers. For example, the object linking system 100 may further include another server 40.

Each of the server 10 and a plurality of the user terminals 20 is communicably connected to a communication network 30 such as the Internet. Connection between the communication network 30 and the server 10 and connection between the communication network 30 and the plurality of user terminals 20 may be wired connection or wireless connection. For example, the plurality of user terminals 20 may be connected to the communication network 30 by performing data communication with a base station managed by a communication service provider using a wireless communication line. The other server 40 is also communicably connected to the communication network 30. Connection between the communication network 30 and the other server 40 may be wired connection or wireless connection.

The object linking system 100A, by including the server 10 and the user terminal 20, implements various functions for executing various processes in accordance with the operation of the user.

The server 10 includes the processor 101, the memory 102, and the storage device 103. For example, the processor 101 is a central processing device such as a central processing unit (CPU) that performs various calculations and controls. In addition, in a case where the server 10 includes a graphics processing unit (GPU), the GPU may perform a part of the various calculations and controls. The server 10 executes various information processes by the processor 101 using data read into the memory 102 and stores obtained process results in the storage device 103 as needed.

The storage device 103 has a function as a storage medium storing various information. A configuration of the storage device 103 is not particularly limited but is preferably a configuration capable of storing all of various information necessary for controls performed in the object linking system 100A from a viewpoint of reducing the process load exerted on the user terminal 20. Such examples include an HDD and an SSD. However, the storage device storing various information may have a storage region in an accessible state from the server 10 and, for example, may be configured to have a dedicated storage region outside the server 10. The server 10 is managed by a manager or the like of the object linking system 100A and has various functions for providing information related to various processes to the plurality of user terminals 20. The server 10 is configured with an information processing apparatus such as a game server that can render AR display data.

The user terminal 20 is configured with a communication terminal that can provide an information service accompanying display in AR to the user in a state where the user holds or wears the user terminal 20. Examples of the communication terminal include, for example, the mobile phone terminal 201 such as a smartphone and the AR glasses 202 and 203. The communication terminal may be a stationary game apparatus, a portable game apparatus, a personal computer, a gaming PC, or a so-called wearable device, or a combination of a plurality of the communication terminals. The configuration of the user terminal that may be included in the object linking system 100A is not limited thereto and may be a configuration in which the user may visually recognize the display in AR.

The user terminal 20 includes the processor 501, the memory 502, and the storage device 503. For example, the processor 501 is a central processing device such as a central processing unit (CPU) that performs various calculations and controls. In addition, in a case where the user terminal 20 includes a graphics processing unit (GPU), the GPU may perform a part of the various calculations and controls. The user terminal 20 executes various information processes by the processor 501 using data read into the memory 502 and stores obtained process results in the storage device 503 as needed. The storage device 503 has a function as a storage medium storing various information.

The user terminal 20 is connected to the communication network 30 and includes hardware and software for executing various processes by communicating with the server 10. Each of the plurality of user terminals 20 may be configured to be capable of directly communicating with each other without the server 10 or the other server 40.

The user terminal 20 may incorporate a display device. The display device may be connected to the user terminal 20 in a wireless or wired manner. The display device displays images such as a still picture and a motion picture. The display device may display a game screen. In addition, the display device can perform display in augmented reality (AR) superimposed on a real space. Examples of the display device include a hologram display device that can perform hologram display, and a projection device that projects images (including the game screen) to a screen or the like. In the example in FIG. 8, the touch panel screen included in the mobile phone terminal 201, the AR displays included in the AR glasses 202 and 203, and the like correspond to the display device.

The user terminal 20 may incorporate an input device. In addition, the input device may be connected to the user terminal 20 in a wireless or wired manner. The input device receives an operation input provided by the user. The processor included in the server 10 or the processor included in the user terminal 20 executes various control processes in accordance with the operation input provided by the user. Examples of the input device include the touch panel screen included in the mobile phone terminal 201, the controller CTR that is connected to the AR glasses 202 in a wireless or wired manner, and the like. In addition, the camera included in the user terminal 20 may correspond to the input device. The user provides the operation input (gesture input) by a gesture such as moving a hand in front of the camera. The user terminal is not limited thereto.

The other server 40 includes the processor 401, the memory 402, and the storage device 403. For example, the processor 401 is a central processing device such as a central processing unit (CPU) that performs various calculations and controls. In addition, in a case where the other server 40 includes a graphics processing unit (GPU), the GPU may perform a part of the various calculations and controls. The other server 40 executes various information processes by the processor 401 using data read into the memory 402 and stores obtained process results in the storage device 403 as needed.

The storage device 403 has a function as a storage medium storing various information. The configuration of the storage device 403 is not limited thereto. The storage device storing various information may have a storage region in an accessible state from the other server 40 and, for example, may be configured to have a dedicated storage region outside the other server 40. The other server 40 may be managed by the manager or the like of the object linking system 100A or may be managed by other persons. The other server 40 has various functions for providing information related to various processes to the plurality of user terminals 20. For example, the other server 40 may be a server that manages manufacturing and delivery of an actual article.

Figure 9:
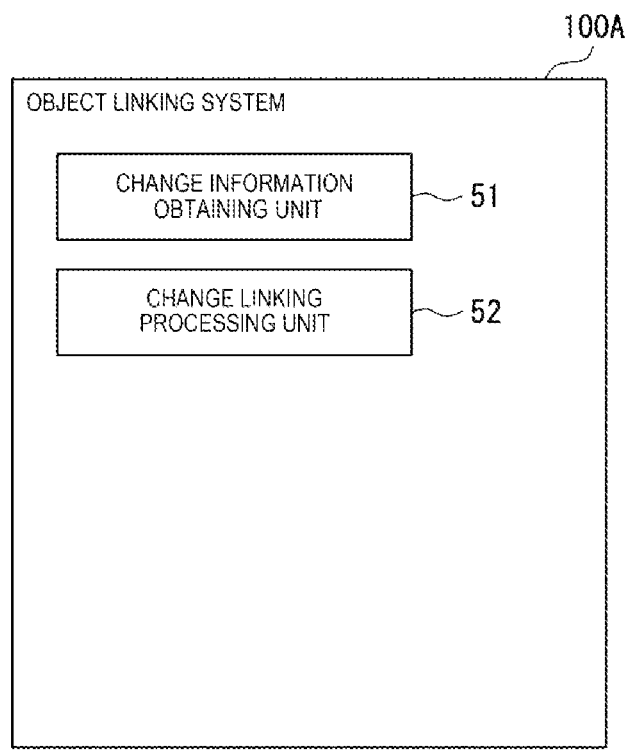
FIG. 9 is a block diagram illustrating the configuration of the object linking system according to at least one embodiment of the present disclosure.

FIG. 9 is a block diagram illustrating the configuration of the object linking system according to at least one embodiment of the present disclosure. The object linking system 100A includes at least a change information obtaining unit 51 and a change linking processing unit 52. One or more processors included in the object linking system 100A functionally implement the change information obtaining unit 51 and the change linking processing unit 52 by referring to the object linking program held (installed) in one or more storage devices included in the object linking system 100A and executing the program.

The change information obtaining unit 51 has a function of obtaining the change information indicating a change in parameter or form of the first object in the first space in a case where one of the real space and the virtual space augmented from the real space is the first space, and the other is the second space. The change linking processing unit 52 has a function of performing the process causing the parameter or the form of one or more second objects in the second space to correspond to the first object after change based on the change information.

Figure 10:
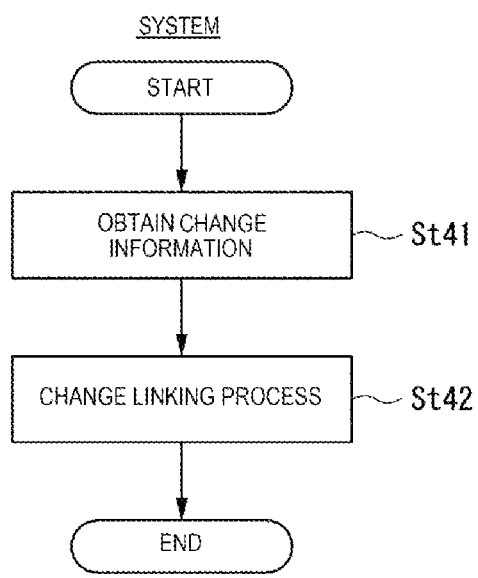
FIG. 10 is a flowchart illustrating an example of the object linking process according to at least one embodiment of the present disclosure.

Next, a program execution process in the fourth embodiment of the present disclosure will be described. FIG. 10 is a flowchart illustrating an example of the object linking process according to at least one embodiment of the present disclosure.

The change information obtaining unit 51 obtains the change information indicating a change in parameter or form of the first object in the first space (St41). The change linking processing unit 52 performs the process (change linking process) causing the parameter or the form of one or more second objects in the second space to correspond to the first object after change based on the change information (St42).

The real space means a space in a real world. The virtual space augmented from the real space means a virtual space (AR space) corresponding to an AR object displayed (displayed in AR) in a superimposed manner on the real space.

The first object and the second object will be described. The first object and the second object have opposite meanings depending on whether the first space is the real space or the virtual space augmented from the real space. Thus, here, a case where the virtual space augmented from the real space is the first space will be illustratively described.

In a case where the virtual space augmented from the real space is the first space, the first object means a virtual object that can be output (displayed) in the virtual space. Examples of the first object include an item that can be output (for example, displayed) in the virtual space. For example, the item may be a sword, a shield, a helmet, an armor, a wand, clothes, an orb, a gun, or a musical instrument. The first object in the above case may be a vehicle. For example, the vehicle may be an automobile, an electric train, a motorcycle, a mine car, a ship, an airplane, or a robot. The first object in the above case may be an animate object such as a bird, a cat, a dog, a dinosaur, grass, or a tree. A fictional animate object such as a dragon may also be the first object in the above case. Furniture such as a chair or a desk, a built object such as a house or a building, a street, a continent, a planet, a star, or the like that can be output in the virtual space as a virtual object may also correspond to the first object. Besides, for example, a character (includes both of a non-player character and a player character) appearing in a video game or an avatar of the user may also correspond to the first object. The augmented reality diorama described later may also correspond to the first object. These first objects may be held in a storage device included in the object linking system 100A or a storage device connectable to the object linking system 100A in a format of 3D model data that can be displayed in AR.

The augmented reality diorama means a virtual diorama displayed in a superimposed manner on the real space. Examples of the augmented reality diorama include a street, a road, a railway, a built object, a group of built objects, a stadium of baseball, soccer, or the like, a shrine or a temple, a castle, a mountain, the sea, a river, a swamp, a grove, a forest, a field, a paddy field, an airport, an underground passage, a cave, and the like represented as 3D model data to be displayed in augmented reality (AR). The augmented reality diorama may not necessarily be based on a modern landscape that exists in the reality. Examples of the augmented reality diorama also include a medieval European streetscape or construction and a fictional streetscape or construction appearing in an animation, a comic book, or the like.

In a case where the virtual space augmented from the real space is the first space, the second object means an actual object present in the real space. The second object may be an object for playing (play object). Examples of the second object include a miniature car, a doll, a transformation belt, a sword, a shield, a gun, a magic wand, and other toys present in the real space. Besides, a diorama (for example, an N-scale diorama) present in the real space is also an actual object present in the real space and thus, corresponds to the second object.

The second object may be a miniature toy (for example, a miniature car that is a miniature toy of an automobile, or a figure corresponding to a character or an avatar in the virtual space) of each object illustrated above as the first object. In addition, the second object may be a card (for example, a card for a card game) or the like having information related to each object illustrated above as the first object. For example, a card of which a drawing of each object illustrated above as the first object is drawn on an outer surface or an inner surface, or a card in which information indicating each object illustrated above as the first object is written as data may correspond to the second object.

The first object and the second object may correspond to each other. For example, in a case where the first object is an automobile in the virtual space, the second object may be a miniature toy of an automobile in the real space, a card in which information about an automobile is written, or the like. In a case where the first object is an augmented reality diorama, the second object may be a diorama in the real world.

In a case where the real space is the first space, and the virtual space is the second space, a content of meaning of each of the first object and the second object is opposite to the above content. For example, a miniature car in the real space is the first object, and a 3D model or the like of an automobile that can be output (displayed) in the virtual space is the second object.

A parameter of an object is a value indicating an attribute of the object and is referred to as the status or the status information in the field of game. In a case where the object is a character, examples of the parameter include health (HP), mana (MP), strength (STR), attack power (ATK), vitality (VIT), defense power (DEF), intelligence (INT), resistance (RES), dexterity (DEX), agility (AGI), luck (LUK), a level (LV), an experience value (EXP), a skill point (SP), and the like. In a case where the object is an inanimate object such as a wall or a weapon, examples of the parameter include hardness, rarity, and the like. In a case where the object is a vehicle, examples of the parameter include a speed, acceleration, turnability, horsepower, traction, thrust, rigidity, and the like. The above are examples of the parameter, and the object may have other types of parameters.

A form of an object means a shape, a pattern, or a color, or a combination thereof of the object in a predetermined basic pose. As an example of a change in shape, in a case where a wing is mounted on the rear of a miniature car that is an object, the shape of the miniature car changes. As an example of a change in pattern, in a case where an emblem appears on the forehead, a cheek, or the like of a character that is an object, the pattern of the character changes. As an example of a change in color, in a case where color of hair or skin of a character that is an object changes to blue, red, gold, or the like, the color of the character changes. Comparison in shape between objects may be performed in the respective basic poses (for example, a standing state) thereof. Thus, a change in form of the object here does not include a change in pose and a change in position of the object.

An object may have a correlation relationship between a change in parameter and a change in form. For example, in a case where a wing is mounted on the rear of the miniature car, not only the shape changes, but also the parameter "speed" changes. The parameter "power" may change in accordance with a change in pattern or color such that an emblem appears on the forehead of the character, or the color of hair changes.

Causing the parameter or the form of the second object to correspond to the first object after change means changing the parameter or the form of the second object in accordance with the change in parameter or form of the first object. In a case where the real space is the first space, a specific example of the above is such that in a case where the user mounts a wing on a miniature car that is the first object, a wing is also mounted on an automobile that is the second object in the virtual space under control of the server 10, and the parameter "speed" that is an attribute value of the second object is increased. In a case where the virtual space is the first space, a specific example of the above is such that in a case where a wing is mounted on an automobile that is the first object in the virtual space under control of the server 10, the server 10 outputs or transmits command information for shipping an actual article of the wing that is an additional part to the user, to a server (the server 10 or the other server 40 or the like) that manages manufacturing or shipping of the actual article. Besides, the server 10 may output or transmit command information for shipping an actual article of a miniature car on which a wing is mounted, or may transmit a command to print the actual article to a 3D printer. Command information for writing data indicating a wing or data indicating an automobile on which a wing is mounted into a card (second object) may be transmitted to a card writer directly from the server 10 or through the user terminal 20. In a case where a lock mechanism (for example, a key) that prevents a change in form is disposed in the actual article, an unlock signal for unlocking the lock may be transmitted toward the actual article from the server 10. For example, the change linking processing unit 52 controls the above information process. The above process example is merely an example. The change linking processing unit 52 may perform various processes in which the parameter or the form of the second object is linked to a change in parameter or form of the first object based on the change information obtained by the change information obtaining unit 11.

A change in parameter or form of the first object may not be the same as a change in parameter or form of the second object in a strict sense. In a case of an object in the virtual space, the object can be changed to any form. However, an object in the real space has physical restrictions. Thus, the same change may not be made between the virtual space and the real space in a strict sense. Thus, in the real space, the actual object may be colored to have a color that is similar to the color in the virtual space and can be represented in the reality. In addition, in a case where an object having the shape of the object in the virtual space falls down due to a position or the like of a center of gravity in the real space, the shape of the actual object in the real space may be appropriately changed.

The parameters or the forms of the plurality of second objects may be changed in connection with a change in parameter or form of the first object. For example, when the user attaches a wing to a miniature car, 100 automobiles to which wings are attached may be displayed in AR on the display device in the virtual space under control of the change linking processing unit 52.

As one aspect of the fourth embodiment, in a case of playing a game using an object (AR object) superimposed on the real space, a change in parameter or form can be linked between an actual object such as a figure present in the real world and the AR object. Thus, the user can enjoy the game by changing the parameter or the form of the object in both of the real space and the AR space, and the interest of the user can be improved.

Fifth Embodiment

A summary of a fifth embodiment of the present disclosure will be described. Hereinafter, an object linking program executed in a user terminal will be illustratively described as the fifth embodiment. A user terminal 20A may be any of the plurality of user terminals 20 and 201 to 203 illustrated in FIG. 1 or FIG. 8.

Figure 11:
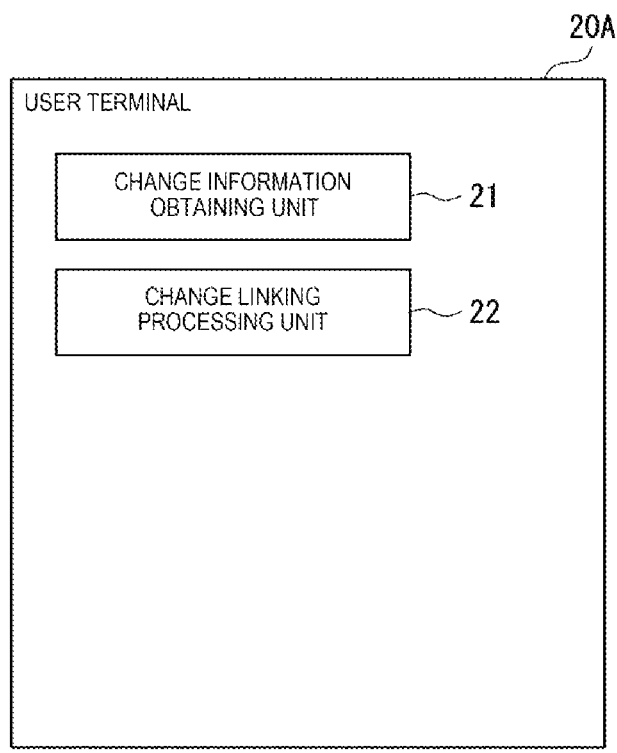
FIG. 11 is a block diagram illustrating a configuration of a user terminal according to at least one embodiment of the present disclosure.

FIG. 11 is a block diagram illustrating a configuration of the user terminal according to at least one embodiment of the present disclosure. The user terminal 20A that is an example of the configuration of the user terminal 20 includes at least a change information obtaining unit 21 and a change linking processing unit 22. The processor included in the user terminal 20A functionally implements the change information obtaining unit 21 and the change linking processing unit 22 by referring to the object linking program held (installed) in the storage device and executing the program.

The change information obtaining unit 21 has a function of obtaining the change information indicating a change in parameter or form of the first object in the first space in a case where one of the real space and the virtual space augmented from the real space is the first space, and the other is the second space. The change linking processing unit 22 has a function of performing the process causing the parameter or the form of one or more second objects in the second space to correspond to the first object after change based on the change information.

Figure 12:
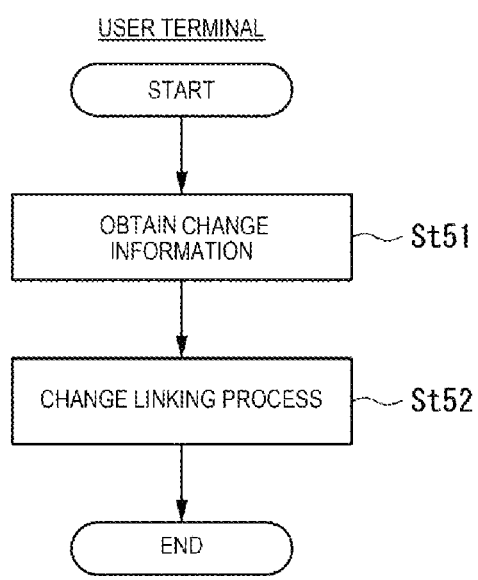
FIG. 12 is a flowchart illustrating an example of the object linking process according to at least one embodiment of the present disclosure.

Next, a program execution process in the fifth embodiment of the present disclosure will be described. FIG. 12 is a flowchart illustrating an example of the object linking process according to at least one embodiment of the present disclosure.

The change information obtaining unit 21 obtains the change information indicating a change in parameter or form of the first object in the first space (St51). The change linking processing unit 22 performs the process (change linking process) causing the parameter or the form of one or more second objects in the second space to correspond to the first object after change based on the change information (St52).

The real space means a space in the real world. The virtual space augmented from the real space means a virtual space (AR space) corresponding to an AR object displayed (displayed in AR) in a superimposed manner on the real space.

The first object and the second object will be described. The first object and the second object have opposite meanings depending on whether the first space is the real space or the virtual space augmented from the real space. Thus, here, a case where the virtual space augmented from the real space is the first space will be illustratively described.

In a case where the virtual space augmented from the real space is the first space, the first object means a virtual object that can be output (displayed) in the virtual space. Examples of the first object include an item that can be output (for example, displayed) in the virtual space. For example, the item may be a sword, a shield, a helmet, an armor, a wand, clothes, an orb, a gun, or a musical instrument. The first object in the above case may be a vehicle. For example, the vehicle may be an automobile, an electric train, a motorcycle, a mine car, a ship, an airplane, or a robot. The first object in the above case may be an animate object such as a bird, a cat, a dog, a dinosaur, grass, or a tree. A fictional animate object such as a dragon may also be the first object in the above case. Furniture such as a chair or a desk, a built object such as a house or a building, a street, a continent, a planet, a star, or the like that can be output in the virtual space as a virtual object may also correspond to the first object. Besides, for example, a character (includes both of a non-player character and a player character) appearing in a video game or an avatar of the user may also correspond to the first object. An augmented reality diorama described later may also correspond to the first object. These first objects may be held in a storage device included in the object linking system 100 or a storage device connectable to the object linking system 100 in a format of 3D model data that can be displayed in AR.

The augmented reality diorama means a virtual diorama displayed in a superimposed manner on the real space. Examples of the augmented reality diorama include a street, a road, a railway, a built object, a group of built objects, a stadium of baseball, soccer, or the like, a shrine or a temple, a castle, a mountain, the sea, a river, a swamp, a grove, a forest, a field, a paddy field, an airport, an underground passage, a cave, and the like represented as 3D model data to be displayed in augmented reality (AR). The augmented reality diorama may not necessarily be based on a modern landscape that exists in the reality. Examples of the augmented reality diorama also include a medieval European streetscape or construction and a fictional streetscape or construction appearing in an animation, a comic book, or the like.

In a case where the virtual space augmented from the real space is the first space, the second object means an actual object present in the real space. The second object may be an object for playing (play object). Examples of the second object include a miniature car, a doll, a transformation belt, a sword, a shield, a gun, a magic wand, and other toys present in the real space. Besides, a diorama (for example, an N-scale diorama) present in the real space is also an actual object present in the real space and thus, corresponds to the second object.

The second object may be a miniature toy (for example, a miniature car that is a miniature toy of an automobile, or a figure corresponding to a character or an avatar in the virtual space) of each object illustrated above as the first object. In addition, the second object may be a card (for example, a card for a card game) or the like having information related to each object illustrated above as the first object. For example, a card of which a drawing of each object illustrated above as the first object is drawn on an outer surface or an inner surface, or a card in which information indicating each object illustrated above as the first object is written as data may correspond to the second object.

The first object and the second object may correspond to each other. For example, in a case where the first object is an automobile in the virtual space, the second object may be a miniature toy of an automobile in the real space, a card in which information about an automobile is written, or the like. In a case where the first object is an augmented reality diorama, the second object may be a diorama in the real world.

In a case where the real space is the first space, and the virtual space is the second space, a content of meaning of each of the first object and the second object is opposite to the above content. For example, a miniature car in the real space is the first object, and a 3D model or the like of an automobile that can be output (displayed) in the virtual space is the second object.

A parameter of an object is a value indicating an attribute of the object and is referred to as a status or status information in the field of game. In a case where the object is a character, examples of the parameter include health (HP), mana (MP), strength (STR), attack power (ATK), vitality (VIT), defense power (DEF), intelligence (INT), resistance (RES), dexterity (DEX), agility (AGI), luck (LU K), a level (LV), an experience value (EXP), a skill point (SP), and the like. In a case where the object is an inanimate object such as a wall or a weapon, examples of the parameter include hardness, rarity, and the like. In a case where the object is a vehicle, examples of the parameter include a speed, acceleration, turnability, horsepower, traction, thrust, rigidity, and the like. The above are examples of the parameter, and the object may have other types of parameters.

A form of an object means a shape, a pattern, or a color, or a combination thereof of the object in a predetermined basic pose. As an example of a change in shape, in a case where a wing is mounted on the rear of a miniature car that is an object, the shape of the miniature car changes. As an example of a change in pattern, in a case where an emblem appears on the forehead, a cheek, or the like of a character that is an object, the pattern of the character changes. As an example of a change in color, in a case where color of hair or skin of a character that is an object changes to blue, red, gold, or the like, the color of the character changes. Comparison in shape between objects may be performed in the respective basic poses (for example, a standing state) thereof. Thus, a change in form of the object here does not include a change in pose and a change in position of the object.

An object may have a correlation relationship between a change in parameter and a change in form. For example, in a case where a wing is mounted on the rear of the miniature car, not only the shape changes, but also the parameter "speed" changes. The parameter "power" may change in accordance with a change in pattern or color such that an emblem appears on the forehead of the character, or the color of hair changes.

Causing the parameter or the form of the second object to correspond to the first object after change means changing the parameter or the form of the second object in accordance with the change in parameter or form of the first object. In a case where the real space is the first space, a specific example of the above is such that in a case where the user mounts a wing on a miniature car that is the first object, a wing is also mounted on an automobile that is the second object in the virtual space under control of the server 10, and the parameter "speed" that is an attribute value of the second object is increased. In a case where the virtual space is the first space, a specific example of the above is such that in a case where a wing is mounted on an automobile that is the first object in the virtual space under control of the server 10, the server 10 outputs or transmits command information for shipping an actual article of the wing that is an additional part to the user, to a server (the server 10 or the other server 40 or the like) that manages manufacturing or shipping of the actual article. Besides, the server 10 may output or transmit command information for shipping an actual article of a miniature car on which a wing is mounted, or may transmit a command to print the actual article to a 3D printer. Command information for writing data indicating a wing or data indicating an automobile on which a wing is mounted into a card (second object) may be transmitted to a card writer directly from the server 10 or through the user terminal 20A. In a case where a lock mechanism (for example, a key) that prevents a change in form is disposed in the actual article, an unlock signal for unlocking the lock may be transmitted toward the actual article from the server 10. For example, the change linking processing unit 22 controls the above information process. The above process example is merely an example. The change linking processing unit 22 may perform various processes in which the parameter or the form of the second object is linked to a change in parameter or form of the first object based on the change information obtained by the change information obtaining unit 21.

A change in parameter or form of the first object may not be the same as a change in parameter or form of the second object in a strict sense. In a case of an object in the virtual space, the object can be changed to any form. However, an object in the real space has physical restrictions. Thus, the same change may not be made between the virtual space and the real space in a strict sense. Thus, in the real space, the actual object may be colored to have a color that is similar to the color in the virtual space and can be represented in the reality. In addition, in a case where an object having the shape of the object in the virtual space falls down due to a position or the like of a center of gravity in the real space, the shape of the actual object in the real space may be appropriately changed.

Parameters or forms of a plurality of the second objects may be changed in connection with a change in parameter or form of the first object. For example, when the user attaches a wing to a miniature car, 100 automobiles to which wings are attached may be displayed in AR on the display device in the virtual space under control of the change linking processing unit 22.

As one aspect of the fifth embodiment, in a case of playing a game using an object (AR object) superimposed on the real space, a change in parameter or form can be linked between an actual object such as a figure present in the real world and the AR object. Thus, the user can enjoy the game by changing the parameter or the form of the object in both of the real space and the AR space, and the interest of the user can be improved.

Sixth Embodiment

A summary of a sixth embodiment of the present disclosure will be described. Hereinafter, an object linking program executed in a server will be illustratively described as the sixth embodiment.

Figure 13:
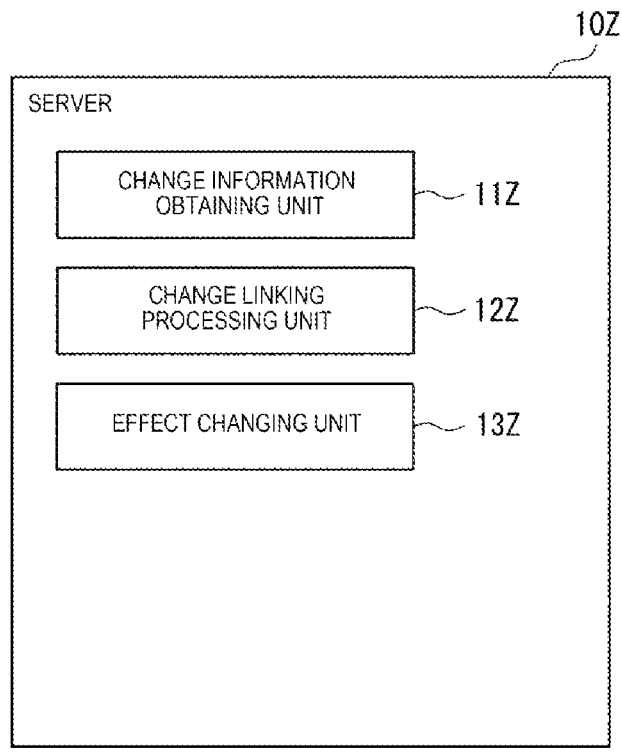
FIG. 13 is a block diagram illustrating a configuration of the server according to at least one embodiment of the present disclosure.

FIG. 13 is a block diagram illustrating a configuration of the server according to at least one embodiment of the present disclosure. A server 10Z that is an example of the configuration of the server 10 includes at least a change information obtaining unit 11Z and a change linking processing unit 12Z. The server 10Z may further include an effect changing unit 13Z. The processor included in the server 10Z functionally implements the change information obtaining unit 11Z, the change linking processing unit 12Z, and the effect changing unit 13Z by referring to the object linking program held (installed) in the storage device and executing the program.

The change information obtaining unit 11Z has a function of obtaining the change information indicating a change in parameter or form of the first object in the first space in a case where one of the real space and the virtual space augmented from the real space is the first space, and the other is the second space. The change linking processing unit 12Z has a function of performing the process causing the parameter or the form of one or more second objects in the second space to correspond to the first object after change based on the change information. The effect changing unit 13Z has a function of changing information indicating an aspect (effect) of a change in parameter or form of the first object or the second object based on predetermined information.

Figure 14:
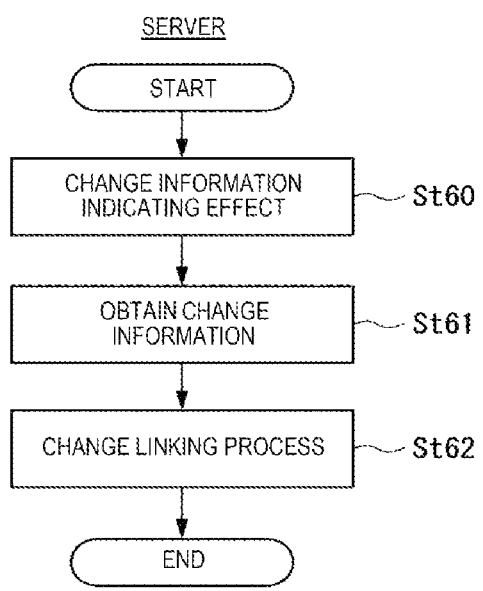
FIG. 14 is a flowchart illustrating an example of the object linking process according to at least one embodiment of the present disclosure.

Next, a program execution process in the sixth embodiment of the present disclosure will be described. FIG. 14 is a flowchart illustrating an example of the object linking process according to at least one embodiment of the present disclosure.

The effect changing unit 13Z changes information indicating the aspect (effect) of a change in parameter or form of the first object or the second object based on the predetermined information (St60). The change information obtaining unit 11Z obtains the change information indicating a change in parameter or form of the first object in the first space (St61). The change linking processing unit 12Z performs the process (change linking process) causing the parameter or the form of one or more second objects in the second space to correspond to the first object after change based on the change information (St62).

The real space means a space in the real world. The virtual space augmented from the real space means a virtual space (AR space) corresponding to an AR object displayed (displayed in AR) in a superimposed manner on the real space.

The first object and the second object will be described. The first object and the second object have opposite meanings depending on whether the first space is the real space or the virtual space augmented from the real space. Thus, here, a case where the virtual space augmented from the real space (hereinafter, may be simply referred to as the virtual space) is the first space will be illustratively described.

In a case where the virtual space augmented from the real space is the first space, the first object means a virtual object that can be output (displayed) in the virtual space. Examples of the first object include an item that can be output (for example, displayed) in the virtual space. For example, the item may be a sword, a shield, a helmet, an armor, a wand, clothes, an orb, a gun, or a musical instrument. The first object in the above case may be a vehicle. For example, the vehicle may be an automobile, an electric train, a motorcycle, a mine car, a ship, an airplane, or a robot. The first object in the above case may be an animate object such as a bird, a cat, a dog, a dinosaur, grass, or a tree. A fictional animate object such as a dragon may also be the first object in the above case. Furniture such as a chair or a desk, a built object such as a house or a building, a street, a continent, a planet, a star, or the like that can be output in the virtual space as a virtual object may also correspond to the first object. Besides, for example, a character (includes both of a non-player character and a player character) appearing in a video game or an avatar of the user may also correspond to the first object. The augmented reality diorama described later may also correspond to the first object. These first objects may be held in a storage device included in the object linking system 100 or a storage device connectable to the object linking system 100 in a format of 3D model data that can be displayed in AR.

The augmented reality diorama means a virtual diorama displayed in a superimposed manner on the real space. Examples of the augmented reality diorama include a street, a road, a railway, a built object, a group of built objects, a stadium of baseball, soccer, or the like, a shrine or a temple, a castle, a mountain, the sea, a river, a swamp, a grove, a forest, a field, a paddy field, an airport, an underground passage, a cave, and the like represented as 3D model data to be displayed in augmented reality (AR). The augmented reality diorama may not necessarily be based on a modern landscape that exists in the reality. Examples of the augmented reality diorama also include a medieval European streetscape or construction and a fictional streetscape or construction appearing in an animation, a comic book, or the like.

In a case where the virtual space augmented from the real space is the first space, the second object means an actual object present in the real space. The second object may be an object for playing (play object). Examples of the second object include a miniature car, a doll, a transformation belt, a sword, a shield, a gun, a magic wand, and other toys present in the real space. Besides, a diorama (for example, an N-scale diorama) present in the real space is also an actual object present in the real space and thus, corresponds to the second object.

The second object may be a miniature toy (for example, a miniature car that is a miniature toy of an automobile, or a figure corresponding to a character or an avatar in the virtual space) of each object illustrated above as the first object. In addition, the second object may be a card (for example, a card for a card game) or the like having information related to each object illustrated above as the first object. For example, a card of which a drawing of each object illustrated above as the first object is drawn on an outer surface or an inner surface, or a card in which information indicating each object illustrated above as the first object is written as data may correspond to the second object.

The first object and the second object may correspond to each other. For example, in a case where the first object is an automobile in the virtual space, the second object may be a miniature toy of an automobile in the real space, a card in which information about an automobile is written, or the like. In a case where the first object is an augmented reality diorama, the second object may be a diorama in the real world.

In a case where the real space is the first space, and the virtual space is the second space, a content of meaning of each of the first object and the second object is opposite to the above content. For example, a miniature car in the real space is the first object, and a 3D model or the like of an automobile that can be output (displayed) in the virtual space is the second object.

A parameter of an object is a value indicating an attribute of the object and is referred to as a status or status information in the field of game. In a case where the object is a character, examples of the parameter include health (HP), mana (MP), strength (STR), attack power (ATK), vitality (VIT), defense power (DEF), intelligence (INT), resistance (RES), dexterity (DEX), agility (AGI), luck (LU K), a level (LV), an experience value (EXP), a skill point (SP), and the like. In a case where the object is an inanimate object such as a wall or a weapon, examples of the parameter include hardness, rarity, and the like. In a case where the object is a vehicle, examples of the parameter include a speed, acceleration, turnability, horsepower, traction, thrust, rigidity, and the like. The above are examples of the parameter, and the object may have other types of parameters.

A form of an object means a shape, a pattern, or a color, or a combination thereof of the object in a predetermined basic pose. As an example of a change in shape, in a case where a wing is mounted on the rear of a miniature car that is an object, the shape of the miniature car changes. As an example of a change in pattern, in a case where an emblem appears on the forehead, a cheek, or the like of a character that is an object, the pattern of the character changes. As an example of a change in color, in a case where color of hair or skin of a character that is an object changes to blue, red, gold, or the like, the color of the character changes. Comparison in shape between objects may be performed in the respective basic poses (for example, a standing state) thereof. Thus, a change in form of the object here does not include a change in pose and a change in position of the object.

An object may have a correlation relationship between a change in parameter and a change in form. For example, in a case where a wing is mounted on the rear of the miniature car, not only the shape changes, but also the parameter "speed" changes. The parameter "power" may change in accordance with a change in pattern or color such that an emblem appears on the forehead of the character, or the color of hair changes.

Causing the parameter or the form of the second object to correspond to the first object after change means changing the parameter or the form of the second object in accordance with the change in parameter or form of the first object. In a case where the real space is the first space, a specific example of the above is such that in a case where the user mounts a wing on a miniature car that is the first object, a wing is also mounted on an automobile that is the second object in the virtual space under control of the server 10Z, and the parameter "speed" that is an attribute value of the second object is increased. In a case where the virtual space is the first space, a specific example of the above is such that in a case where a wing is mounted on an automobile that is the first object in the virtual space under control of the server 10Z, the server 10Z outputs or transmits command information for shipping an actual article of the wing that is an additional part to the user, to a server (the server 10Z or the other server 40 or the like) that manages manufacturing or shipping of the actual article. Besides, the server 10Z may output or transmit command information for shipping an actual article of a miniature car on which a wing is mounted, or may transmit a command to print the actual article to a 3D printer. Command information for writing data indicating a wing or data indicating an automobile on which a wing is mounted into a card (second object) may be transmitted to a card writer directly from the server 10Z or through the user terminal 20. In a case where a lock mechanism (for example, a key) that prevents a change in form is disposed in the actual article, an unlock signal for unlocking the lock may be transmitted toward the actual article from the server 10Z. For example, the change linking processing unit 12Z controls the above information process. The above process example is merely an example. The change linking processing unit 12Z may perform various processes in which the parameter or the form of the second object is linked to a change in parameter or form of the first object based on the change information obtained by the change information obtaining unit 11Z.

A change in parameter or form of the first object may not be the same as a change in parameter or form of the second object in a strict sense. In a case of an object in the virtual space, the object can be changed to any form. However, an object in the real space has physical restrictions. Thus, the same change may not be made between the virtual space and the real space in a strict sense. Thus, in the real space, the actual object may be colored to have a color that is similar to the color in the virtual space and can be represented in the reality. In addition, in a case where an object having the shape of the object in the virtual space falls down due to a position or the like of a center of gravity in the real space, the shape of the actual object in the real space may be appropriately changed.

Parameters or forms of a plurality of the second objects may be changed in connection with a change in parameter or form of the first object. For example, when the user attaches a wing to a miniature car, 100 automobiles to which wings are attached may be displayed in AR on the display device in the virtual space under control of the change linking processing unit 12Z.

As described above, in step St62, the change linking processing unit 12Z performs the process (change linking process) causing the parameter or the form of one or more second objects in the second space to correspond to the first object after change. A condition for performing the change linking process may be provided. For example, in a case where the numerical value related to the change in parameter or form of the first object is greater than the predetermined value, the change linking processing unit 12Z may perform the change linking process. In addition, in a case where using the co-used object used together with the first object in the first space changes the parameter or the form of the first object, the change linking processing unit 12Z may perform the change linking process.

The numerical value related to the change in parameter or form of the first object means a numerical value having any correlation with the change in parameter or form of the first object. For example, the numerical value related to the change in parameter or form of the first object may be a numerical value having a correlation with a demand of the user (how much the user desires the change) for the change in parameter or form of the first object.

Specific examples of the numerical value related to the change in parameter or form of the first object are as follows.

The number of times the parameter or the form of the first object changes.

A cumulative value of points or money used for changing the parameter or the form of the first object.

The number or a cumulative total number of users who change the parameter or the form of the first object.

In a case where an achievement condition for changing the parameter or the form of the first object is present, the number of times the achievement condition is satisfied.

Specific examples of the achievement condition are as follows.

The number of times data indicating a predetermined application or a predetermined object is downloaded is greater than or equal to a certain value.

The number or a cumulative total number of users who download data indicating a predetermined application or a predetermined object is greater than or equal to a certain value.

The number of times a predetermined user installs a predetermined application on the user terminal or the like of the user, or the number of the predetermined applications installed is greater than or equal to a certain value.

The number of times a still picture or a motion picture for advertisement is displayed on the display device included in the user terminal or the like, or a total value of a display time period is greater than or equal to a certain value.

The number of times the user draws lots is greater than or equal to a certain value.

The number of missions completed by a predetermined user within a predetermined game is greater than or equal to a certain value.

A value of a level of a character used by a predetermined user within a predetermined game is greater than or equal to a certain value.

A predetermined user plays a predetermined game up to a predetermined checkpoint (for example, a second chapter).

For example, in a case where the numerical value related to the change in parameter or form of the first object is large, the demand of the user for changing the parameter or the form of the first object is estimated to be high. Therefore, in a case where a demand higher than or equal to a certain degree is estimated, the change linking processing unit 12Z performs the change linking process. Accordingly, a change in parameter or form of the second object can be linked to a change in parameter or form of the first object in accordance with the demand of the user. Particularly, in a case where the real space is the second space, linking of the change in parameter or form takes a certain cost (for example, a manufacturing cost or a mailing cost for the actual article of the additional part). Thus, linking between the real space and the virtual space can be efficiently performed by prioritizing a change for which the demand of the user is high.

The co-used object means an object that is used together with the first object in the first space. In a case where the first object is a miniature car or a figure present in the real space, examples of the co-used object include an additional part such as a wing attached to the rear of the miniature car or a sword, a wand, a jewel, or the like possessed by the figure. In addition, in a case where the first object is a doll present in the real space, a costume or clothes worn on the doll, a key inserted into a keyhole disposed in the doll in order to undress the doll, or the like corresponds to the co-used object. In the former case, a state where a character obtains a power-up when the character increases in size is assumed. In the latter case, a state where a character conversely obtains a power-up when the character decreases in size is assumed. A card that is inserted into a card slot disposed in the first object and in which information indicating an additional part or information indicating a change in status of the first object is written is also an example of the co-used object. The co-used object may be an object that is used together with the first object in other aspects. In a case where the virtual space is the first space, a virtual object corresponding to the co-used object present in the real space may be a co-used object in the virtual space.

Here, a meaning of an object for change described later will be described. The object for change is an object that is used together with the second object in the second space. The object for change is an object for changing a base object in the second space to the second object having the parameter or the form corresponding to the first object after change.

The base object means an object that is a source (base) for obtaining the second object having the parameter or the form corresponding to the first object after change. The base object may be the second object having the parameter or the form corresponding to the first object before change may be other objects.

In a case where the base object is a miniature car or a figure present in the real space, examples of the object for change include an additional part such as a wing attached to the rear of the miniature car or a sword, a wand, a jewel, or the like possessed by the figure. In addition, in a case where the base object is a doll, a costume or clothes worn on the doll, a key inserted into a keyhole disposed in the doll in order to undress the doll, or the like corresponds to the object for change. In the former case, a state where a character obtains a power-up when the character increases in size is assumed. In the latter case, a state where a character conversely obtains a power-up when the character decreases in size is assumed. A card that is inserted into a card slot disposed in the base object and in which information or the like indicating an additional part or information indicating a change in status of the base object is written is also an example of the object for change. These are merely an example, and the object for change may be an object used together with the base object in other aspects. In a case where the virtual space is the first space, a virtual object corresponding to the object for change present in the real space may be an object for change in the virtual space.

In Case where First Space is Real Space

In a case where the first space is the real space, and the second space is the virtual space, the second object is an object in the virtual space. Thus, in step St62, the change linking processing unit 12Z may output information indicating one or more second objects having the parameter or the form corresponding to the first object after change based on the change information.

For example, output of the information indicating the second object may be not only display of the second object on a display device capable of performing the display in AR but also output of voice (engine sound or the like of an automobile) or vibration (in a case of using a haptic device) corresponding to the second object. Output of the information here may also include transmission of the information indicating the second object to an apparatus capable of outputting information about the voice, the vibration, or the like.

Figure 15:
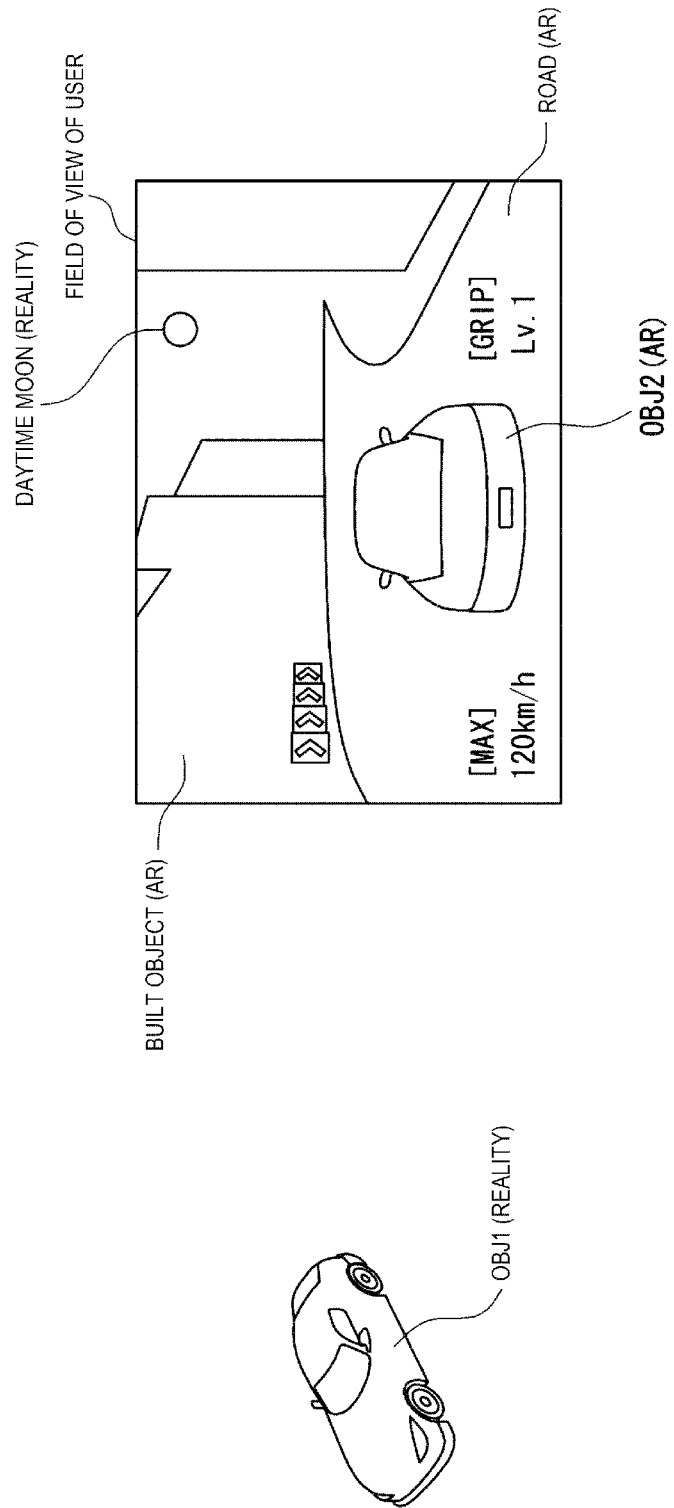
FIG. 15 is a conceptual diagram illustrating linking between a first object and a second object according to at least one embodiment of the present disclosure.

FIG. 15 is a conceptual diagram illustrating linking between the first object and the second object according to at least one embodiment of the present disclosure. A first object OBJ1 is present in the first space that is the real space. The first object OBJ1 is a radio-controlled car possessed by the user. In the second space, a second object OBJ2 corresponding to the first object OBJ1 is displayed in AR. The second object OBJ2 is an automobile used by the user in a racing game using the user terminal 20. The second object OBJ2 is displayed in AR on the display device included in the user terminal 20 or a display device connected to the user terminal 20. The display in AR (display in augmented reality) means display in a superimposed manner on the real space.

A rectangular frame illustrated in FIG. 15 illustrates a field of view of the user. While a field of view of a person does not have a rectangular shape in a strict sense, the field of view is divided by the rectangular frame for convenience of description accompanying illustration. For example, in a case of using the AR glasses, the field of view of the user is wider than the illustrated rectangular frame. For example, in a case of using the mobile phone terminal 201 such as a smartphone, the illustrated rectangular frame corresponds to a display screen of the mobile phone terminal 201. In this case, the display screen of the mobile phone terminal 201, a main body (part around the display screen) of the mobile phone terminal 201, and the real space outside the main body of the mobile phone terminal 201 enter the field of view of the user.

A road and built objects built on both sides of the road are displayed in AR in the field of view of the user as augmented reality dioramas. The second object OBJ2 and four arrow signs indicating progress directions are further displayed in AR. Furthermore, texts indicating a maximum speed (MAX 120 km/h) and grip (GRIP Lv. 1) that are parameters of the second object OBJ2 are displayed on the display device. In addition, a daytime moon present in the real space enters the field of view of the user.

The first object OBJ1 and the second object OBJ2 at the point in time illustrated in FIG. 15 have forms in which wings are not mounted on the rear.

Figure 16:
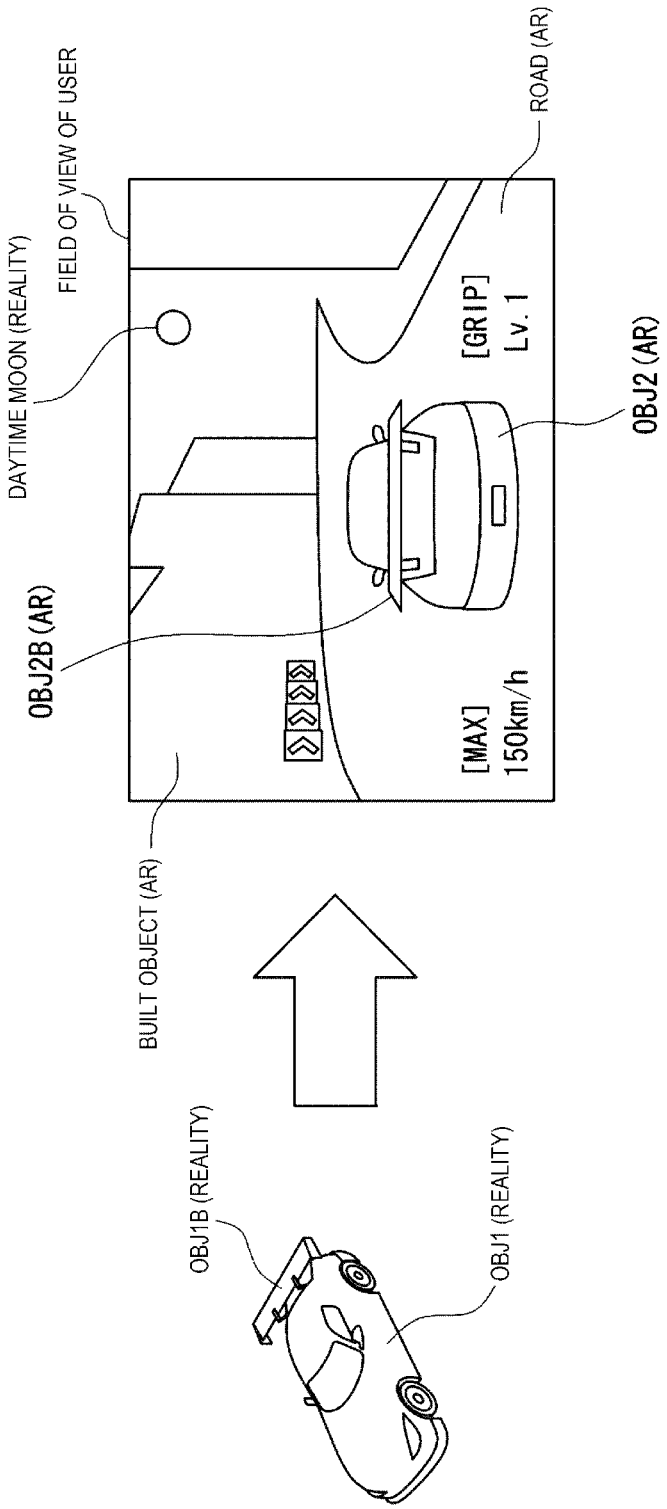
FIG. 16 is a conceptual diagram illustrating linking between the first object and the second object according to at least one embodiment of the present disclosure.

FIG. 16 is a conceptual diagram illustrating linking between the first object and the second object according to at least one embodiment of the present disclosure. The first object OBJ1 in the first space, the second object OBJ2 in the second space, the rectangular frame, the road, the built objects, and the daytime moon are the same as in FIG. 15 and thus, will not be described.

In step St61, the change information obtaining unit 11Z obtains the change information indicating a change in parameter or form of the first object OBJ1 in the first space. In the present example, the user mounts a wing that is an additional part on the first object OBJ1 that is a radio-controlled car in the real space. The wing is a co-used object OBJ1B that is used together with the first object OBJ1. Using the first object OBJ1 and the co-used object OBJ1B together changes the form of the first object OBJ1. That is, a form not having the wing is changed to a form having the wing. The change information obtaining unit 11Z obtains the change information that is information indicating this change in form.

A method of transmitting the change information to the change information obtaining unit 11Z from the first object OBJ1 is not particularly limited. For example, the user terminal 20 is caused to touch NFC tags embedded in both of the first object OBJ1 and the co-used object OBJ1B, and the user terminal 20 reads data from both of the first object OBJ1 and the co-used object OBJ1B. The processor included in the user terminal 20 generates the change information based on the read data and transmits the change information to the server 10Z. In addition, the first object OBJ1 that is a radio-controlled car on which a wing is mounted may be imaged using the camera included in the user terminal 20. The user terminal 20 recognizes an image in which the first object OBJ1 and the co-used object are used together (a wing is mounted on a radio-controlled car) based on the captured image. The user terminal 20 generates the change information based on the image recognition result and transmits the change information to the server 10Z. Besides, the first object OBJ1 may have an information communication function between the first object OBJ1 and the communication network 30. A processor included in the first object OBJ1 having the communication function senses that a wing that is the co-used object OBJ1B is mounted, and transmits the change information to the server 10Z by controlling the communication function. A method of transmitting the change information to the change information obtaining unit 11Z of the server 10Z from the first object OBJ1 is not limited to the above example and may be appropriately implemented by those skilled in the art.

The change linking processing unit 12Z outputs information indicating one or more second objects having a parameter or a form corresponding to the first object OBJ1 after change to the form in which the wing is mounted, based on the obtained change information. In the present embodiment, the change linking processing unit 12Z displays the second object OBJ2 that is an automobile having a form in which a wing is mounted, in AR on the display device. In addition, a changed parameter of the second object OBJ2 may be displayed on the display device. In FIG. 16, a text indicating the maximum speed (MAX 150 km/h) that is the parameter after change is displayed.

Here, the second object OBJ2 displayed in the racing game using the display in AR is used by the user. The second object OBJ2 corresponds to the base object in the second space. The wing displayed in AR corresponds to an object for change OBJ2B for changing the base object to the second object having a parameter or a form corresponding to the first object OBJ1 after change. The change linking processing unit 12Z outputs information indicating the object for change OBJ2B. For example, the change linking processing unit 12Z displays a wing that is the object for change OBJ2B, in AR on the display device.

The change linking processing unit 12Z may output information indicating a plurality of the second objects OBJ2 or a plurality of the objects for change OBJ2B. For example, in the racing game using the display in AR, a plurality of automobiles having parameters or forms corresponding to the first object OBJ1 after change may be displayed in AR on the display device.

Figure 17:
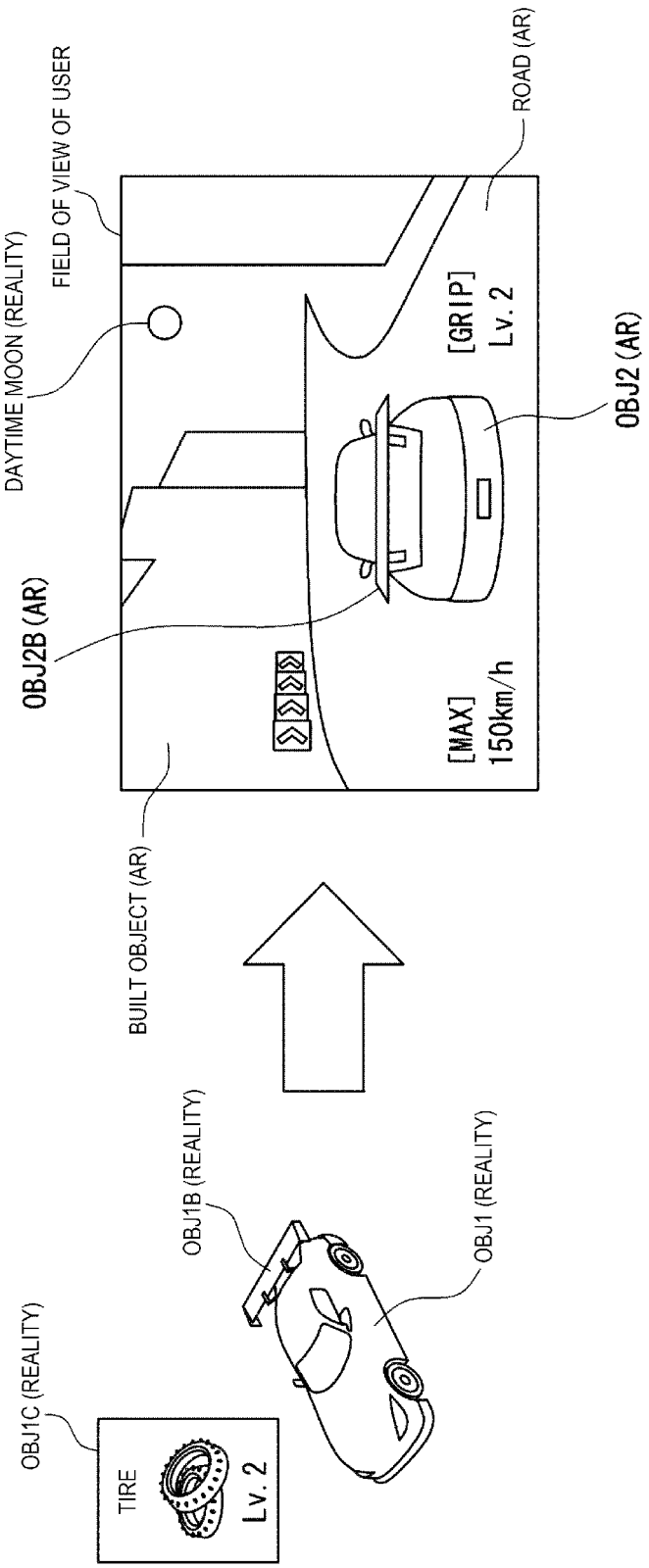
FIG. 17 is a conceptual diagram illustrating linking between the first object and the second object according to at least one embodiment of the present disclosure.

FIG. 17 is a conceptual diagram illustrating linking between the first object and the second object according to at least one embodiment of the present disclosure. The first object OBJ1 in the first space, the co-used object OBJ1B, the second object OBJ2 in the second space, the object for change OBJ2B, the rectangular frame, the road, the built objects, and the daytime moon are the same as in FIG. 16 and thus, will not be described.

FIG. 17 illustrates a case of using a co-used object OBJ1C. The co-used object OBJ1C is a card on which a drawing of tires that are additional parts is drawn, and information about a parameter "grip" is recorded. The user performs an operation such as causing the card to touch the first object OBJ1 that is a radio-controlled car, or passing the card through a card slot disposed in the first object OBJ1. Accordingly, grip of the first object OBJ1 is increased.

A function of changing the grip may be provided in advance in the radio-controlled car by setting. An increase in grip means a change in parameter of the first object OBJ1. The change information indicating this change in parameter is transmitted to the server 10Z from the first object OBJ1 in the same manner as described above based on FIG. 16. The change information obtaining unit 11Z obtains the change information. The change linking processing unit 12Z outputs information indicating one or more second objects having a parameter or a form corresponding to the first object OBJ1 after a parameter of tires is changed, based on the obtained change information. For example, the change linking processing unit 12Z displays the second object OBJ2 that is an automobile having improved grip, in AR on the display device. In addition, a changed parameter of the second object OBJ2 may be displayed on the display device. In FIG. 17, a text indicating the grip (GRIP Lv. 2) that is the parameter after change is displayed.

In the above, the first object is a radio-controlled car, and the second object is an automobile. Thus, both have almost the same forms. However, the first object and the second object may have different forms. For example, the first object may be a radio-controlled car, and the second object may include an automobile and an augmented reality diorama displayed in AR. In this case, the user changes an exterior of the radio-controlled car that is the first object to an exterior of a car that is a model in 10 years ago. This change in exterior can be implemented using a method such as replacing a cover attached to an upper portion of a main body of the radio-controlled car with another cover by the user. The change information obtaining unit 11Z obtains the change information indicating the change in exterior of the radio-controlled car. The change linking processing unit 12Z displays a virtual automobile that is the second object and an augmented reality diorama that is also the second object, in AR on the display device based on the change information. Here, the virtual automobile displayed in AR has the exterior of the model in 10 years ago. The augmented reality diorama displayed in AR is changed to a diorama that reproduces a streetscape in 10 years ago. Accordingly, a change in first object and a change in world view represented by the display in AR can be linked. A change in first object and a change in location (Japan, a foreign country, another world, in a dream, or the like) represented by the augmented reality diorama may also be linked.

In Case where First Space is Virtual Space

In a case where the first space is the virtual space, and the second space is the real space, the second object is an object in the real space. In this case, in step St62, the change linking processing unit 12Z may output command information causing the user to obtain one or more second objects having the parameter or the form corresponding to the first object after change based on the change information. The command information may be command information causing the user to obtain the object for change for changing the base object in the second space to the second object having the parameter or the form corresponding to the first object after change.

Meanings of the base object and the object for change are the same as described above and thus, will not be described. The command information causing the user to obtain the second object or the object for change may be information output to other function blocks in the server 10Z. The command information causing the user to obtain the second object or the object for change may be request information transmitted to other apparatuses (the other server 40, the user terminal 20, and the like). For example, the command information includes a request message that instructs the other server 40 managing manufacturing and delivery of the actual article to manufacture and deliver the second object or the object for change.

The command information causing the user to obtain the second object or the object for change may be command information for modeling the object using a 3D printer that is connected to the server 10Z directly or through the communication network 30, the user terminal 20, or the like. This command information may include 3D model data corresponding to the actual article that is a modeling target.

In a case where the second object or the object for change is implemented as a card, the command information causing the user to obtain the second object or the object for change may be command information for writing information indicating the form of the object after change or parameter information after change into the card. In this case, the change linking processing unit 12Z transmits the command information for performing writing on the card to a card writer. The card writer may be connected to the server 10Z directly or through the communication network 30, the user terminal 20, or the like.

The command information for performing writing on the card may include information for updating a design of the outer surface of the card. In this case, for example, the card writer updates the design of the outer surface of the card using a leuco method or a white turbidity method. The updated design of the outer surface of the card may correspond to the second object or the object for change.

In addition, in a case where the user is present in a cafe, a venue of a game competition, or the like, the command information causing the user to obtain the second object or the object for change may be message information notifying a store clerk or venue staff (hereinafter, referred to as the store clerk or the like) of an instruction to hand over the second object that is an actual article or the object for change that is an actual article to the user. The command information causing the user to obtain the second object or the object for change may be command information for outputting text information, voice information, or the like corresponding to the instruction to an information terminal possessed by the store clerk or the like, or may be command information for printing information corresponding to the instruction using a printer. The store clerk or the like hands over the second object or the object for change after the parameter or the form is changed, to the user in accordance with a message output to the information terminal or an instruction document printed on paper.

FIG. 18 is a conceptual diagram illustrating linking between the first object and the second object according to at least one embodiment of the present disclosure. In the first space, the first object OBJ1 is displayed in AR. That is, the first object OBJ1 is displayed in AR on the display device included in the user terminal 20 or the display device connected to the user terminal 20. The first object OBJ1 is a player character (PC) used by the user in a role-playing game (RPG) using the user terminal 20. In the second space, the second object OBJ2 corresponding to the first object OBJ1 is present. The second object OBJ2 is a modeled object (figure) that is an actual article possessed by the user.

A rectangular frame illustrated in FIG. 18 illustrates the field of view of the user. While a field of view of a person does not have a rectangular shape in a strict sense, the field of view is divided by the rectangular frame for convenience of description accompanying illustration. For example, in a case of using the AR glasses, the field of view of the user is wider than the illustrated rectangular frame. For example, in a case of using the mobile phone terminal 201 such as a smartphone, the illustrated rectangular frame corresponds to a display screen of the mobile phone terminal 201. In this case, the display screen of the mobile phone terminal 201, a main body (part around the display screen) of the mobile phone terminal 201, and the real space outside the main body of the mobile phone terminal 201 enter the field of view of the user.

A slide S that is an actual object in the real space enters the field of view of the user. The first object OBJ1 is displayed in AR. A text indicating muscular strength (muscular strength: 10) and attack power (attack power: 15) that are parameters of the first object OBJ1 is displayed on the display device.

FIG. 19 is a conceptual diagram illustrating linking between the first object and the second object according to at least one embodiment of the present disclosure. The first object OBJ1, the slide S, the second object OBJ2, and the rectangular frame are the same as in FIG. 18 and thus, will not be described.

A level of the first object OBJ1 that is the player character is increased in accordance with progress of the role-playing game, and the parameter of the first object OBJ1 changes. More specifically, the muscular strength changes to 13 from 10, and the attack power changes to 18 from 15. Furthermore, the form of the first object OBJ1 changes in accordance with the increase in muscular strength. More specifically, arms and legs of the player character are bulked up.

In step St61, the change information obtaining unit 11Z obtains the change information indicating a change in parameter or form of the first object OBJ1 in the first space. In the present example, the change information obtaining unit 11Z obtains the change information indicating changes in parameter "muscular strength" and parameter "attack power" of the first object OBJ1 and a change in form of the first object OBJ1. For example, a transmission source of the change information may be the user terminal 20.

The change linking processing unit 12Z outputs command information for newly delivering a modeled object (figure) that is an actual article having bulked-up arms and legs to the user based on the obtained change information. For example, the command information may be transmitted to the other server 40 managing manufacturing and delivery of the actual article. Consequently, the user can obtain the second object OBJ2 having a parameter or a form corresponding to the first object OBJ1 after change.

FIG. 20 is a conceptual diagram illustrating linking between the first object and the second object according to at least one embodiment of the present disclosure. The first object OBJ1, the slide S, the second object OBJ2, and the rectangular frame are the same as in FIG. 18 and thus, will not be described.

The player character obtains the co-used object OBJ1B that is a sword, in accordance with the progress of the role-playing game. The co-used object OBJ1B is displayed in AR together with the first object OBJ1. Using the co-used object OBJ1B changes the parameter of the first object OBJ1. More specifically, the attack power changes to 21 from 18. In addition, using the co-used object OBJ1B changes the form of the first object OBJ1 to a form of carrying the sword on the back.

In step St61, the change information obtaining unit 11Z obtains the change information indicating a change in parameter or form of the first object OBJ1 in the first space. In the present example, the change information obtaining unit 11Z obtains the change information indicating a change in parameter "attack power" of the first object OBJ1 and a change in form of the first object OBJ1. For example, the transmission source of the change information may be the user terminal 20.

The change linking processing unit 12Z outputs command information for delivering the object for change OBJ2B that is an actual article of a toy to the user based on the obtained change information. For example, the command information may be transmitted to the other server 40 managing manufacturing and delivery of the actual article. Consequently, the user can obtain the second object OBJ2 having a parameter or a form corresponding to the first object OBJ1 after change by combining the second object OBJ2 that is the already obtained modeled object (figure) with the object for change OBJ2B that is the newly delivered actual article of the toy.

FIG. 21 is a conceptual diagram illustrating linking between the first object and the second object according to at least one embodiment of the present disclosure. The first object OBJ1, the slide S, and the rectangular frame are the same as in FIG. 18 and thus, will not be described.

The player character enchants the co-used object OBJ1B that is a sword, with fire magic in accordance with the progress of the role-playing game. Consequently, color of a blade of the sword changes. That is, using the co-used object OBJ1B changes the color included in the form of the first object OBJ1. A shape or a pattern of the sword may change in accordance with the enchantment with fire magic. Using the co-used object OBJ1B changes the parameter of the first object OBJ1. More specifically, the attack power changes to 99 from 21.

In step St61, the change information obtaining unit 11Z obtains the change information indicating a change in parameter or form of the first object OBJ1 in the first space. In the present example, the change information obtaining unit 11Z obtains the change information indicating a change in parameter "attack power" of the first object OBJ1 and a change in form of the first object OBJ1 (a form of carrying the sword having the changed color on the back). For example, the transmission source of the change information may be the user terminal 20.

The change linking processing unit 12Z outputs command information for delivering an object for change OBJ2C that is a card present in the real space to the user based on the obtained change information. For example, the command information may be transmitted to the other server 40 managing manufacturing and delivery of the actual article. Information indicating the sword enchanted with magic is recorded on the card. The change linking processing unit 12Z may output command information for writing the information indicating the sword enchanted with magic on a card obtained in advance by the user. In this case, the card on which the information is written corresponds to the object for change OBJ2C.

The user causes the obtained object for change OBJ2C of a card type to touch the object for change OBJ2B that is the actual article of the toy already obtained. A function of changing the color of the blade by reading the information recorded on the card is implemented in advance in the object for change OBJ2B. The user can obtain the second object OBJ2 having a parameter or a form corresponding to the first object OBJ1 after change by combining the second object OBJ2 that is the already obtained modeled object (figure) with the object for change OBJ2B of which the color of the blade is changed using the card.

In the above example, while the user uses the object for change OBJ2C in order to change the form of the object for change OBJ2B, this is merely an example. The user may use the object for change OBJ2C in order to change the form or the parameter of the second object OBJ2.

Application of Token

Various information related to the first object or the second object may be tokenized or may be handled together with a token. Examples of the token include a non fungible token (NFT). However, a type of token is not limited to the NFT. For example, the token may be a re-fungible token (RFT). For example, the type of token may be a fungible token (FT) unless otherwise contradicted. Hereinafter, the type of token will be described as the NFT.

Figure 22:
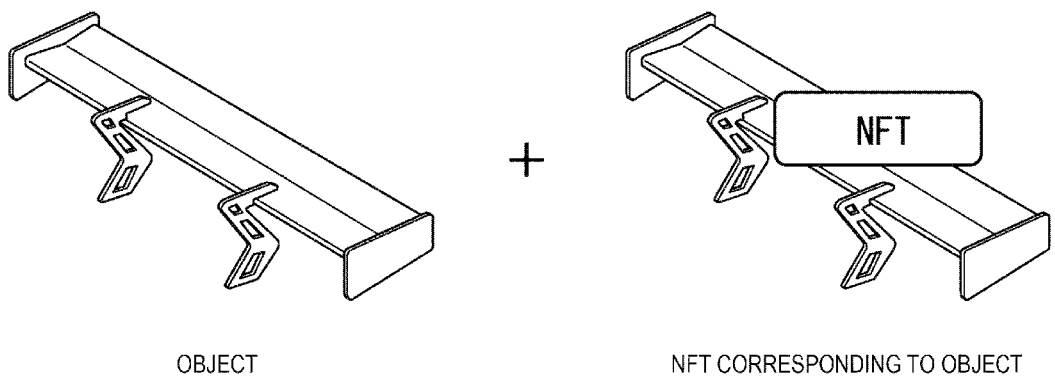
FIG. 22 is a conceptual diagram illustrating a set of an object in a real space and an NFT corresponding to the object according to at least one embodiment of the present disclosure.

An object in the real space and the NFT corresponding to the object may be provided to the user as a set. FIG. 22 is a conceptual diagram illustrating the set of the object in the real space and the NFT corresponding to the object according to at least one embodiment of the present disclosure. A process entity related to provision of at least one of the object in the real space and the NFT corresponding to the object may be the server 10Z or other apparatuses. The object in the real space may include the first object, the second object, the co-used object, and the object for change. The NFT may be provided to the user at the same time as the object in the real space or may be provided to the user at a different timing from the object in the real space.

An object in the virtual space may be tokenized into the NFT. Tokenization into the NFT refers to issuing (creation) of the NFT based on source information (in the present example, information about the object in the virtual space). A process of tokenizing any information into the NFT may be performed by the server 10Z or may be performed by an apparatus other than the server 10Z. The issued NFT may be provided to the user. The object in the virtual space may include the first object, the second object, the co-used object, and the object for change.

The issued NFT may be used for linking the parameter or the form between the first object and the second object. For example, the change information obtaining unit 11Z may obtain the change information indicating a change in parameter or form of the first object on a condition that the user is tied to the NFT. The change linking processing unit 12Z may perform the process causing the parameter or the form of one or more second objects in the second space to correspond to the first object after change based on the change information, on a condition that the user is tied to the NFT. In a case where the user is tied to the NFT, the user refers to a so-called possessor of the NFT. More specifically, information related to the user may be recorded in a distributed ledger corresponding to the NFT as the current possessor of the NFT.

The NFT may also be used for purposes other than linking of the parameter or the form between the first object and the second object. The user tied to the NFT may be changed from a certain user to another user.

By providing the object in the real space and the NFT corresponding to the object as a set, various services using the object and the NFT can be provided to the user.

Changing of Effect

An aspect of a change in parameter or form of an object can be represented as an "effect". For example, the maximum speed corresponds to a parameter for an object of a car in the virtual space. A change in parameter such that the maximum speed is increased by 20 (km/h) can be represented as effect 20 (a degree of change in maximum speed is 20). The same applies to a change in form of the object. For example, a change in parameter such that an angle of a windshield that affects air resistance in the object of the car in the virtual space is set close to a horizontal direction by 2 degrees can be represented as effect 2 (a degree of change in angle is 2).

Here, as described above, the server 10Z may further include the effect changing unit 13Z in addition to the change information obtaining unit 11Z and the change linking processing unit 12Z. The effect changing unit 13Z has a function of changing information indicating the aspect (effect) of a change in parameter or form of the first object or the second object based on the predetermined information. Hereinafter, the information indicating the aspect of the change in parameter or form of the object will be simply referred to as information indicating the effect.

Figure 23:
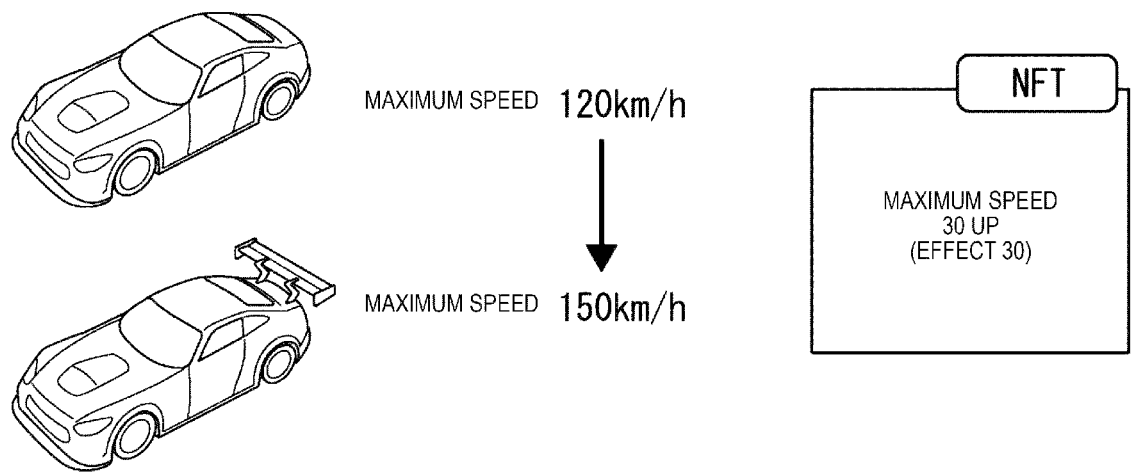
FIG. 23 is a conceptual diagram illustrating an example of tokenizing information indicating an effect into the NFT according to at least one embodiment of the present disclosure.

The information indicating the effect may be tokenized. FIG. 23 is a conceptual diagram illustrating an example of tokenizing the information indicating the effect into the NFT according to at least one embodiment of the present disclosure. For example, information indicating an effect of increasing the maximum speed of a car object by 30 (km/h) is tokenized into the NFT. In FIG. 23, the issued NFT (effect 30) is conceptually illustrated. The effect changing unit 13Z changes the information indicating the effect based on the predetermined information. For example, the NFT of effect 30 is changed to effect 50. Here, effect 50 means an effect of increasing the maximum speed of the car object by 50 (km/h).

The information indicating the effect may be used in a case of changing the parameter or the form of the first object or may be used in a case of changing the parameter or the form of the second object. For example, the information indicating the effect may be included in the change information. The information indicating the effect may be stored in the memory 102 or the storage device 103 of the server 10Z or a storage device accessible from the server 10Z. The accessible storage device includes a storage device connected to an apparatus accessible from the server 10Z through a network.

The server 10Z may change the parameter or the form of the first object or the second object based on the information indicating the effect.

For example, the predetermined information for changing the information indicating the effect is as follows.

Information indicating the number of objects or NFTs possessed by the user.

Information indicating a time when the user obtains an object or an object included in a group to which the object belongs.

Information indicating a time when the user obtains an NFT or an NFT included in a group to which the NFT belongs.

Information indicating the number of NFTs used by the user.

Information indicating the number of NFTs used by a member of a group to which the user belongs.

Information indicating whether or not another user is involved in a case where the user obtains an object or an NFT.

Information indicating the number of NFTs of the same type present in a blockchain.

Information indicating the number of transfers of an NFT.

Information indicating the number of uses of an NFT.

This information may be stored in the memory 102 or the storage device 103 of the server 10Z or a storage device accessible from the server 10Z. The accessible storage device includes a storage device connected to an apparatus accessible from the server 10Z through a network. The effect changing unit 13Z obtains this information.

Information Indicating Number of Objects or NFTs Possessed by User

For example, in a case where the user possesses two objects, the effect changing unit 13Z changes the information indicating the effect to effect 20. In a case where the user possesses three objects, the effect changing unit 13Z changes the information indicating the effect to effect 30. In a case where the user possesses three NFTs, the effect changing unit 13Z changes the information indicating the effect to effect 15. In a case where the user possesses four NFTs, the effect changing unit 13Z changes the information indicating the effect to effect 20.

Information Indicating Time when the User Obtains Object or Object Included in Group to which Object Belongs For example, in a case where the user obtains an object or an object included in a group to which the object belongs during a campaign period from August 1 to September 30, the effect changing unit 13Z changes the information indicating the effect to effect 60. In a case where the user obtains an object or an object included in a group to which the object belongs during other than the campaign period, the effect changing unit 13Z changes the information indicating the effect to effect 40. For example, the group to which the object belongs may be a group consisting of tires, a wing, and an engine. In a case where the user obtains the engine included in the group to which the tires belong, the information indicating the effect for the tires may be changed.

Information Indicating Time when User Obtains NFT or NFT Included in Group to which NFT Belongs For example, in a case where the user obtains an NFT or an NFT included in a group to which the NFT belongs during a campaign period from January 1 to January 31, the effect changing unit 13Z changes the information indicating the effect to effect 60. In a case where the user obtains an NFT or an NFT included in a group to which the NFT belongs during other than the campaign period, the effect changing unit 13Z changes the information indicating the effect to effect 40. For example, the group to which the NFT belongs may be a group consisting of an NFT corresponding to the tires, an NFT corresponding to the wing, and an NFT corresponding to the engine. In a case where the user obtains the NFT corresponding to the engine included in the group to which the NFT corresponding to the tires belongs, the information indicating the effect for the tires may be changed.

The predetermined information may be defined by regarding the object and the NFT corresponding to the object in the same manner. For example, even in a case where the user obtains the object of the tires, or in a case where the user obtains the NFT corresponding to the tires, the information indicating the effect may be changed in the same manner.

Information Indicating Number of NFTs Used by User

For example, in a case where the user separately uses three NFTs (tokenized from the information indicating the effect) of effect 20, the effect of one NFT that is the information indicating the effect may remain as effect 20. In this case, the total effect is effect 60. Meanwhile, in a case where the user collectively uses three NFTs of effect 20, the effect changing unit 13Z changes the effect of one NFT that is the information indicating the effect to effect 30. In this case, the total effect is effect 90.

Information Indicating Number of NFTs Used by Member of Group to which User Belongs For example, it is assumed that one group is formed with five users. In a case where members in the group contribute the possessed NFTs of effect 20 to collectively use three NFTs of the same type, the effect changing unit 13Z changes the effect of one NFT that is the information indicating the effect to effect 30. In a case where members in the group contribute the possessed NFTs of effect 20 to collectively use four NFTs of the same type, the effect changing unit 13Z changes the effect of one NFT that is the information indicating the effect to effect 40.

Information Indicating Whether or not Another User is Involved in Case where User Obtains Object or NFT For example, in a case where a user B obtains an object or an NFT through a user A, the effect changing unit 13Z changes the information indicating the effect for the user A such that the effect is increased. In this case, the effect changing unit 13Z may change the information indicating the effect for the user B such that the effect is increased.

Information Indicating Number of NFTs of Same Type Present in Blockchain

For example, it is assumed that eight NFTs that are the information indicating the effect and correspond to a certain object are issued in a blockchain, and the effect of one NFT is effect 25 (effect 200 in total). In a case where six of the eight NFTs are burned, and only two NFTs are present in the blockchain, the effect changing unit 13Z may change the effect for remaining one NFT that is the information indicating the effect to effect 100 (effect 200 in total). Since rarity of the remaining NFTs is increased, the effect changing unit 13Z may change the effect for the remaining one NFT that is the information indicating the effect to effect 150 (effect 300 in total).

Information Indicating Number of Transfers of NFT

NFTs can be transferred by transaction. For example, an NFT possessed by the user A can be transferred to the user B. The effect changing unit 13Z may change the information indicating the effect to an effect corresponding to the number of transfers such as effect 200 in a case where the number of transfers of the NFT is one, effect 100 in a case where the number of transfers is two, and effect 50 in a case where the number of transfers is three.

Information Indicating Number of Uses of NFT

The effect changing unit 13Z may change the information indicating the effect to an effect corresponding to the number of uses such as effect 100 in a case where the number of uses of the NFT is one, effect 30 in a case where the number of uses is two, and effect 5 in a case where the number of uses is three.

The predetermined information for changing the information indicating the effect and an aspect of a change in effect based on the predetermined information may be other than those illustrated above. In addition, the predetermined information may be an appropriate combination of the above various information.

The effect changing unit 13Z can perform linking between the first object and the second object in various forms by changing information indicating the aspect (effect) of a change in parameter or form of the first object or the second object based on the predetermined information. Accordingly, the interest of the user can be further improved.

As one aspect of the sixth embodiment, in a case of playing a game using an object (AR object) superimposed on the real space, a change in parameter or form can be linked between an actual object such as a figure present in the real world and the AR object. Thus, the user can enjoy the game by changing the parameter or the form of the object in both of the real space and the AR space, and the interest of the user can be improved.

As one aspect of the sixth embodiment, objects for which linking between the real space and the virtual space is performed can be limited to a part of objects based on the numerical value related to the change in parameter or form of the first object.

As one aspect of the sixth embodiment, a change in parameter or form of the first object in a case of using the co-used object can be linked to a change in parameter or form of the second object. Thus, for example, since assembly of parts or replacement of parts is linked between the real space and the virtual space, the interest of the user can be further improved.

As one aspect of the sixth embodiment, the parameter or the form of the second object displayed in AR can be changed in accordance with a change in parameter or form of the first object present in the real space, and the interest of the user can be further improved.

As one aspect of the sixth embodiment, the parameter or the form of the second object can be changed in accordance with a change in parameter or form of the first object present in the real space using the object for change, and the interest of the user can be further improved.

As one aspect of the sixth embodiment, the parameter or the form of the second object present in the real space can be changed in accordance with a change in parameter or form of the first object displayed in AR, and the interest of the user can be further improved.

As one aspect of the sixth embodiment, the parameter or the form of the second object present in the real space can be changed in accordance with a change in parameter or form of the first object displayed in AR using the object for change, and the interest of the user can be further improved.

As described above, each embodiment of the present application solves one or two or more deficiencies. Effects of each embodiment are non-limiting effects or an example of effects.

In each embodiment, the plurality of user terminals 20 and 201 to 203 and the server 10 execute the above various processes in accordance with various control programs (for example, the object linking program) stored in the respective storage devices thereof.

In addition, the configurations of the object linking system 100 and the object linking system 100A are not limited to the configurations described as an example of each embodiment. For example, a part or all of the processes described as a process executed by the user terminal may be configured to be executed by the server 10. A part or all of the processes described as a process executed by the server 10 may be configured to be executed by any of the plurality of user terminals 20 and 201 to 203. In addition, a part or the entire storage unit (a storage medium or a storage device) included in the server 10 may be configured to be included in any of the plurality of user terminals 20 and 201 to 203. That is, a part or all of the functions included in any one of the user terminal and the server in the object linking system 100 or the object linking system 100A may be configured to be included in the other.

In addition, the program may be configured to implement a part or all of the functions described as an example of each embodiment in a single apparatus not including the communication network.

A non-transitory computer readable medium including the object linking program and the object linking system can also be applied for purposes other than the progress of the game.

APPENDIX

The above description of the embodiments is disclosed in order for those of ordinary knowledge in the field of the disclosure to embody at least the following disclosure.

[1]

An object linking program causing a server to implement, in a case where one of a real space and a virtual space augmented from the real space is a first space, and the other is a second space, a change information obtaining function of obtaining change information indicating a change in parameter or form of a first object in the first space, and a change linking processing function of performing a process causing a parameter or a form of one or more second objects in the second space to correspond to the first object after change based on the change information.

[2]

The object linking program according to [1], in which in the change linking processing function, a function of performing the process causing the parameter or the form of one or more second objects in the second space to correspond to the first object after change in a case where a numerical value related to the change in parameter or form of the first object is greater than a predetermined value is implemented.

[3]

The object linking program according to [1] or [2], in which in the change linking processing function, a function of performing the process causing the parameter or the form of one or more second objects in the second space to correspond to the first object after change in a case where using a co-used object that is used together with the first object in the first space changes the parameter or the form of the first object is implemented.

[4]

The object linking program according to any one of [1] to [3], in which the first space is the real space, the second space is the virtual space, and in the change linking processing function, a function of outputting information indicating the one or more second objects having the parameter or the form corresponding to the first object after change based on the change information is implemented.

[5]

The object linking program according to any one of [1] to [4], in which the first space is the real space, the second space is the virtual space, and in the change linking processing function, a function of outputting information indicating an object for change for changing a base object in the second space to the second object having the parameter or the form corresponding to the first object after change is implemented.

[6]

The object linking program according to any one of [1] to [3], in which the first space is the virtual space, the second space is the real space, and in the change linking processing function, a function of outputting command information causing a user to obtain the one or more second objects having the parameter or the form corresponding to the first object after change based on the change information is implemented.

[7]

The object linking program according to [6], in which the command information is command information causing the user to obtain an object for change for changing a base object in the second space to the second object having the parameter or the form corresponding to the first object after change.

[8]

The object linking program according to any one of [1] to [7], further causing the server to implement an effect changing function of changing information indicating an aspect (effect) of a change in parameter or form of the first object or the second object based on predetermined information.

[9]

A program causing a user terminal capable of communicating with the server to implement at least one function of the functions that the server is caused to implement by the object linking program according to any one of [1] to [8].

[10]

A server on which the object linking program according to any one of [1] to [8] is installed.

[11]

An object linking system including a communication network, a server, and a user terminal, the object linking system including, in a case where one of a real space and a virtual space augmented from the real space is a first space, and the other is a second space, change information obtaining means for obtaining change information indicating a change in parameter or form of a first object in the first space, and change linking processing means for performing a process causing a parameter or a form of one or more second objects in the second space to correspond to the first object after change based on the change information.

[12]

An object linking program causing a user terminal to implement, in a case where one of a real space and a virtual space augmented from the real space is a first space, and the other is a second space, a change information obtaining function of obtaining change information indicating a change in parameter or form of a first object in the first space, and a change linking processing function of performing a process causing a parameter or a form of one or more second objects in the second space to correspond to the first object after change based on the change information.

[13]

A user terminal on which the object linking program according to [12] is installed.

[14]

An object linking method by a computer apparatus, the object linking method including, in a case where one of a real space and a virtual space augmented from the real space is a first space, and the other is a second space, a change information obtaining process of obtaining change information indicating a change in parameter or form of a first object in the first space, and a change linking process of performing a process causing a parameter or a form of one or more second objects in the second space to correspond to the first object after change based on the change information.

[15]

An object linking method by an object linking system including a communication network, a server, and a user terminal, the object linking method including, in a case where one of a real space and a virtual space augmented from the real space is a first space, and the other is a second space, a change information obtaining process of obtaining change information indicating a change in parameter or form of a first object in the first space, and a change linking process of performing a process causing a parameter or a form of one or more second objects in the second space to correspond to the first object after change based on the change information.

INDUSTRIAL APPLICABILITY

One embodiment of the present disclosure is useful for improving the interest of the user.

What is claimed is:

1. A non-transitory computer readable medium storing an object linking program which, when executed, causes a server to perform functions comprising:
    obtaining change information indicating a change in parameter or form of a first object in a first space, the first space being one of a real space and a virtual space augmented from the real space; and
    causing a parameter or a form of one or more second objects in a second space to correspond to the first object after the change based on the change information, the second space being the other of the real space and the virtual space, wherein
    causing the parameter or the form of the one or more second objects in the second space to correspond to the first object comprises causing the parameter or the form of the one or more second objects in the second space to correspond to the first object after the change if using a third object attached to the first object in the first space changes the parameter or the form of the first object.

2. The non-transitory computer readable medium according to claim 1, wherein causing the parameter or the form of the one or more second objects in the second space to correspond to the first object comprises causing the parameter or the form of the one or more second objects in the second space to correspond to the first object after the change if a numerical value related to the change in parameter or form of the first object is greater than a predetermined value.

3. The non-transitory computer readable medium according to claim 1, wherein
the first space is the real space,
the second space is the virtual space, and
causing the parameter or the form of the one or more second objects in the second space to correspond to the first object comprises outputting information indicating the one or more second objects having the parameter or the form corresponding to the first object after the change based on the change information.

4. The non-transitory computer readable medium according to claim 1, wherein
the first space is the real space,
the second space is the virtual space,
causing the parameter or the form of the one or more second objects in the second space to correspond to the first object comprises outputting information indicating an object for change, and
the object for change is configured to cause a base object in the second space to change into the second object having the parameter or the form corresponding to the first object after the change.

5. The non-transitory computer readable medium according to claim 1, wherein
the first space is the virtual space,
the second space is the real space, and
causing the parameter or the form of the one or more second objects in the second space to correspond to the first object comprises outputting command information causing a user to obtain the one or more second objects having the parameter or the form corresponding to the first object after the change based on the change information.

6. The non-transitory computer readable medium according to claim 5, wherein the command information is configured to cause the user to obtain an object for change, and the object for change is configured to cause a base object in the second space to change into the second object having the parameter or the form corresponding to the first object after the change.

7. The non-transitory computer readable medium according to claim 1, wherein the functions further comprise changing information indicating an effect of the change in the parameter or the form of the first object or an effect of a change in the parameter or the form of the second object based on predetermined information.

8. An object linking system, comprising:
a communication network;
a server;
a user terminal; and
a processor configured to:
obtain change information indicating a change in a parameter or a form of a first object in a first space, the first space being one of a real space and a virtual space augmented from the real space; and
cause a parameter or a form of one or more second objects in a second space to correspond to the first object after the change based on the change information, the second space being the other of the real space and the virtual space, wherein
causing the parameter or the form of the one or more second objects in the second space to correspond to the first object comprises causing the parameter or the form of the one or more second objects in the second space to correspond to the first object after the change if using a third object attached to the first object in the first space changes the parameter or the form of the first object.

9. A non-transitory computer readable medium storing an object linking program which, when executed, causes a user terminal to perform:
obtaining change information indicating a change in a parameter or a form of a first object in a first space, the first space being one of a real space and a virtual space augmented from the real space; and
causing a parameter or a form of one or more second objects in the second space to correspond to the first object after the change based on the change information, the second space being the other of the real space and the virtual space, wherein
causing the parameter or the form of the one or more second objects in the second space to correspond to the first object comprises causing the parameter or the form of the one or more second objects in the second space to correspond to the first object after the change if using a third object attached to the first object in the first space changes the parameter or the form of the first object.

* * * * *